United States Patent
Stacy et al.

(10) Patent No.: US 10,179,287 B2
(45) Date of Patent: Jan. 15, 2019

(54) SYSTEMS AND METHODS FOR SCENARIO GENERATION AND MONITORING

(75) Inventors: E. Webb Stacy, Andover, MA (US);
Kevin Sullivan, Lexington, MA (US);
Paul Picciano, Windham, NH (US);
Can Keskin, Gloucester, MA (US)

(73) Assignee: APTIMA, INC., Woburn, MA (US)

( * ) Notice: Subject to any disclaimer, the term of this patent is extended or adjusted under 35 U.S.C. 154(b) by 70 days.

(21) Appl. No.: 14/116,611

(22) PCT Filed: May 9, 2012

(86) PCT No.: PCT/US2012/037143
§ 371 (c)(1),
(2), (4) Date: Dec. 20, 2013

(87) PCT Pub. No.: WO2012/158432
PCT Pub. Date: Nov. 22, 2012

(65) Prior Publication Data
US 2014/0109113 A1    Apr. 17, 2014

Related U.S. Application Data

(60) Provisional application No. 61/483,872, filed on May 9, 2011.

(51) Int. Cl.
*A63F 13/60* (2014.01)
*G09B 9/08* (2006.01)
*G06F 9/54* (2006.01)

(52) U.S. Cl.
CPC .............. *A63F 13/60* (2014.09); *G06F 9/542* (2013.01); *G09B 9/08* (2013.01); *A63F 2300/6009* (2013.01); *A63F 2300/8017* (2013.01)

(58) Field of Classification Search
None
See application file for complete search history.

(56) References Cited

U.S. PATENT DOCUMENTS 4,179,824 A * 12/1979 Marsh ........................... 345/427
5,200,901 A *  4/1993 Gerstenfeld ............ G01S 13/91
701/120

(Continued)

OTHER PUBLICATIONS

Webb Stacy, Paul Picciano, Kevin Sullivan and Jason Sidman. "From Flight Logs to Scenarios: Flying Simulated Mishaps." I/ITSEC 2010 Paper No. 10256. pp. 1-11.

(Continued)

*Primary Examiner* — Umut Onat
*Assistant Examiner* — Phuong N Hoang
(74) *Attorney, Agent, or Firm* — John J Brooks, III

(57) ABSTRACT

Processor based systems and methods of defining a scenario event comprising the steps of identifying an event having an event attribute and generalizing the event attribute to define a generalized event whereby the generalized event is the scenario event. In some embodiments, the steps further comprise identifying a first and second event, generalizing a first and second event attribute to define a first and second generalized event and connecting the first and second generalized event in a continuous envelope to create a scenario envelope. Processor based systems and methods of monitoring an activity comprising the steps of monitoring an activity having an activity attribute and comparing the activity attribute to an event envelope to determine a status of the activity relative to the event envelope.

14 Claims, 20 Drawing Sheets

(56) References Cited

U.S. PATENT DOCUMENTS

| | | | |
|---|---|---|---|
| 7,043,669 B2 | 5/2006 | Brown | |
| 7,184,041 B2* | 2/2007 | Heng et al. | 345/424 |
| 7,194,353 B1* | 3/2007 | Baldwin | G01C 21/00 |
| | | | 701/301 |
| 7,299,157 B2* | 11/2007 | Malik | 702/185 |
| 7,930,159 B1* | 4/2011 | Florissi et al. | 703/13 |
| 8,332,757 B1 | 12/2012 | Davey et al. | |
| 2001/0043722 A1* | 11/2001 | Wildes | G06T 7/206 |
| | | | 382/107 |
| 2003/0098773 A1* | 5/2003 | Chakravarty | G08G 5/0013 |
| | | | 340/3.1 |
| 2005/0065682 A1* | 3/2005 | Kapadia | B64F 5/0081 |
| | | | 701/36 |
| 2006/0089760 A1* | 4/2006 | Love | G08G 5/0039 |
| | | | 701/4 |
| 2006/0146048 A1* | 7/2006 | Wright et al. | 345/419 |
| 2007/0261012 A1 | 11/2007 | Matsuda et al. | |
| 2008/0027841 A1 | 1/2008 | Eder | |
| 2008/0120080 A1* | 5/2008 | Nasle | 703/13 |
| 2008/0310742 A1* | 12/2008 | Kostrzewski | G06K 9/3233 |
| | | | 382/236 |
| 2009/0164272 A1* | 6/2009 | Bittlestone | G06Q 10/00 |
| | | | 705/7.29 |
| 2009/0276458 A1 | 11/2009 | Moulckers et al. | |
| 2010/0266991 A1* | 10/2010 | Gregoire et al. | 434/38 |
| 2014/0298269 A1* | 10/2014 | Underkoffler | G06F 3/017 |
| | | | 715/848 |

OTHER PUBLICATIONS

Ji Jeong Hoon, International Search Report and Written Opinion of the International Searching Authority, dated Dec. 20, 2012, 9 pages, Korean Intellectual Property Office, Korea.

Doctorow, Marleen; Wittrock, M.C.; and Marks, Carolyn, Generative Processes in Reading Comprehension, Journal of Educational Psychology, 1978, pp. 109-118, vol. 70, No. 2, 10 pgs, US.

Armstrong, K. (2007). MFOQA—How we got here and where we're going. Flying Safety, May 2007, US, 2 pgs.

Baddeley, A.D. (1992). Working memory. Science, New Series, vol. 255, No. 5044, Jan. 31, 1992, pp. 556-559, Washington, DC, 4 pgs.

Bransford, J. D., Brown, A. L., & Cocking, R. R. (2000). How people learn: Brain, mind, experience, & school: Expanded Edition. Washington, DC: National Academies Press, 385 pgs.

Brown, J. S., Collins, A., & Duguid, P. (1989). Situated cognition and the culture of learning. Educational Researcher, Washington, DC, 11 pgs.

Chu, D. & Krieg, K. (2005). Military flight operations quality assurance (MFOQA) process implementation. Office of the Secretary of Defense Memorandum, Oct. 11, 2005, Washington, DC, 2 pgs.

Slamecka, N.J., Graf, P. (1978). The generation effect: Delineation of a phenomenon. Journal of Experimental Psychology: Human Learning & Memory, vol. 4, No. 6, 592-604, Washington, DC, 13 pgs.

Liu, M, Williams, D., & Pedersen, S. (2002). Alien Rescue: A Problem-Based Hypermedia Learning Environment for Middle School Science. Journal of Educational Technology Systems, 30(3), US, 25 pgs.

Mayer, R.E. (1997). Multimedia Learning: Are We Asking the Right Questions? Educational Psychologist, 32, 1-19, Washington, DC, 19 pgs.

Rumsfeld, D. (2003). Reducing preventable accidents. Office of the Secretary of Defense Memorandum, May 19, 2003, Washington, DC, 1 pgs.

Schmidt, R.A. & Bjork, R.A. (1992). New conceptualizations of practice: Common principles in three paradigms suggest new concepts for training. Psychological Science, 3(4), 207-217, US, 11 pgs.

Salas, E., & Cannon-Bowers, J.A. (2001). The science of training: A decade of progress. Annual Review of Psychology, 52, 471-499, US, 29 pgs.

Lintern, G. (1989). The learning strategies program: Concluding remarks. Acta Psychologica, 71, 301-309, US, 21 pgs.

* cited by examiner

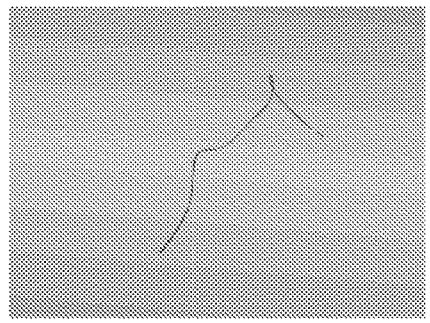
(a) Original flight path
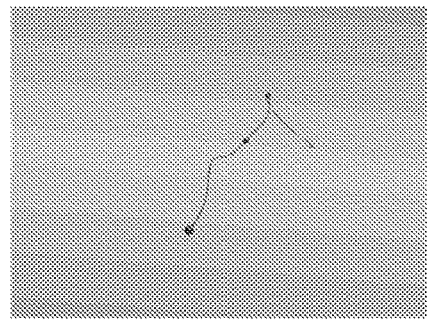
(b) Key events identified
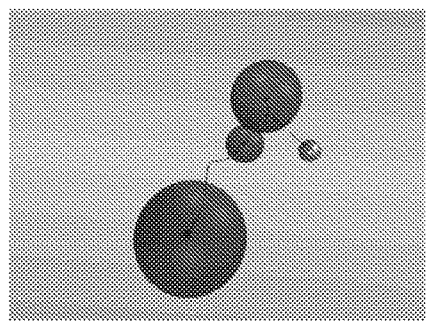
(c) Events generalized in space and time
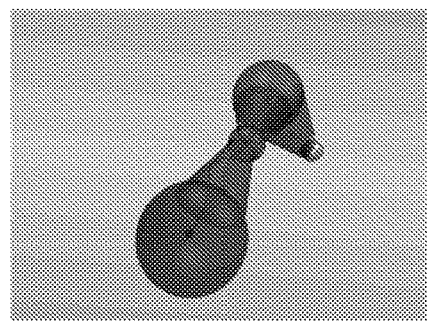
(d) Scenario envelope generated
FIG. 1A

| Event or Decision Point | Conditions for Generalization |
|---|---|
| Mission Brief | Locations of primary and secondary landing sites and training area<br>Current weather at primary and secondary landing sites<br>Predicted weather at primary and secondary landing sites at time of return<br>History of weather conditions at the landing sites |
| Pre-flight | Bingo number calculated for return to primary landing site |
| Reach Bingo Point for return to base | Fuel at 4.5<br>Distance to primary and secondary landing site<br>Ability to communicate with primary and secondary landing sites<br>Current and predicted weather conditions at primary and secondary landing sites.<br>At low altitude |
| Bingo point to secondary landing site reached | Distance to primary and secondary landing site<br>Fuel amount at Bingo point for secondary landing site<br>All other alternate landing sites not available (e.g. KFAT) |
| Weather restricted approach | Aircraft on approach<br>Fuel amount close to minimum for landing<br>No other airport within fuel range<br>Runway visibility less than minimums<br>Runways (in this case 32R and 32L) have different capabilities |
| Trainee stick control | Panicked stick movement |

Table 1

FIG. 21

| USER INTERACTION | SUBTASKS for USER INTERACTION | HOW TO INVOKE THE INTERACTION | FEEDBACK TO USER | FUNCTIONAL RESULTS |
|---|---|---|---|---|
| User can create a new scenario or select an existing scenario [from the Main screen]. | Select create scenario option | Select "Create Scenario" Icon | Pop-up window titled Create Scenario | |
| | | Select File/Create Scenario | Window pops-up titled Create Scenario. | Objects in pop-up window become active. Main screen becomes inactive. |

FIG. 26

| | | | | |
|---|---|---|---|---|
| User can select an existing scenario [from the Main screen]. | Access existing scenarios | Select File, then Load | "Open" Window pops up | Objects in CROSSTAFF Scenario DB window become active; Main screen becomes inactive |
| | | Select File/Load | "Open" Window pops up | Objects in CROSSTAFF Scenario DB window become active; Main screen becomes inactive |
| | Select scenario | Click once on selected folder | Elected folder icon highlights; box with scenario properties appears next to icon | selected scenario properties accessed |
| | | Double-click selected folder | "Open CROSSTAFF Scenario" window disappears; Main screen now shows name of selected scenario in parent folder of Scenario Documents panel | selected scenario loaded to main screen; all related attributes of parent, child folders are active |

FIG. 27

SYSTEMS AND METHODS FOR SCENARIO GENERATION AND MONITORING

CROSS-REFERENCE TO RELATED APPLICATIONS

This application claims benefit to U.S. Pat. App. No. 61/483,872, filed 9 May, 2011, entitled "SYSTEMS AND METHODS FOR SCENARIO GENERATION AND MONITORING" the entire contents of which are incorporated herein by reference.

STATEMENT REGARDING FEDERALLY SPONSORED RESEARCH OR DEVELOPMENT

This invention was made with Government support under Contract #N68335-08-C-0324 and awarded by the U.S. Navy. The Government has certain rights in the invention.

REFERENCE TO SEQUENCE LISTING, A TABLE, OR A COMPUTER PROGRAM LISTING COMPACT DISC APPENDIX

Not Applicable

BACKGROUND OF THE INVENTION

One challenge in simulation and game-based training is to develop realistic scenarios. This is typically a long, labor intensive collaboration between software and simulation engineers, on the one hand, and instructional professionals, on the other. As a result, typical scenario authoring is labor-intensive and takes a long time. The consequence is that fewer scenarios are constructed than are actually needed—sometimes the same scenarios are reused for years on end—and the scenarios do not reflect recent experience or lessons learned because of the delays.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

One example embodiment of the invention provides a processor based method of defining at least one scenario event comprising the steps of identifying at least one event having at least one event attribute and generalizing the at least one event attribute to define a generalized event whereby the generalized event is the at least one scenario event. In some embodiments, the at least one event attribute may comprise at least one decision point.

In some embodiments, the processor based method of defining at least one scenario event may further comprise the step of identifying at least one event having at least one event attribute comprising identifying a first event associated with at least one first event attribute and a second event associated with at least one second event attribute, the step of generalizing the at least one event attribute to define a generalized event comprising generalizing the at least one first event attribute to define a first generalized event and generalizing the at least one second event attribute to define a second generalized event and connecting the first generalized event and the second generalized event in at least one continuous envelope to create at least one scenario envelope. In some embodiments, the at least one first event attribute comprises a first decision point and the at least one second decision point comprises a second decision point. In some embodiments, the at least one first event and the at least one second event represents an actual event. In some embodiment, the step of identifying a first event associated with at least one first event attribute and a second event associated with at least one second event attribute comprises manually selecting the first event and the second event form a partially ordered sequence of events. In some embodiments, the step of identifying a first event associated with at least one first event attribute and a second event associated with at least one second event attribute may comprise automatically selecting the first event and the second event form a partially ordered sequence of events. In some embodiments, the step of generalizing the at least one event attribute to define a generalized event may comprise converting the at least one event attribute to at least one range that includes at least one decision point. In some embodiments, the at least one event attribute may comprise a plurality of event attributes, the at least one range may comprise a plurality of ranges and the at least one scenario envelope may comprise a plurality of scenario envelopes. In some embodiments, the at least one event attribute to define a generalized event may comprise converting defining the at least one event attribute as at least one numerical constraint. In some embodiments, the at least one event attribute may comprise a plurality of event attributes, the at least one range comprises a plurality of ranges and the at least one scenario envelope may comprise a plurality of scenario envelopes. In some embodiments, the step of connecting the first generalized event and the second generalized event in a continuous envelope to create a scenario envelope may comprise defining a set of possible scenario event attributes between and including the first generalized event and the second generalized event. In some embodiments, the step of connecting the first generalized event and the second generalized event in a continuous envelope to create a scenario envelope may comprise: defining a first shape of the first generalized event in an attribute space, defining a second shape of the second generalized event in the attribute space and connecting the first shape and second shape linearly in the attribute space.

In one example embodiment, a processor based method of monitoring an activity is provided, the method comprising monitoring an activity having an activity attribute and comparing the activity attribute to an event envelope to determine a status of the activity relative to the event envelope. In some embodiments, the generalized event may be defined by a generalized event attribute. In some embodiments, the step of comparing the activity attribute to determine a status of the activity relative to the event envelope may comprise comparing the activity attribute to a scenario envelope to determine a status of the activity relative to the scenario envelope and the scenario envelope may be defined by a first generalized event and a second generalized event connected in a continuous envelope. In some embodiments, the continuous envelope may be defined by defining a first shape of the first generalized event in an attribute space, defining a second shape of the second generalized event in the attribute space and connecting the first shape and second shape linearly in the attribute space.

In one example embodiment, a processor based system is provided comprising a memory, a processor, a communications interface, a system bus coupling the memory, the processor and the communications interface and the memory being encoded with a scenario generation process that when executed on the processor is capable of defining at least one scenario event on the computerized device by performing the operations of: identifying at least one event having at least one event attribute and generalizing the at least one event attribute to define a generalized event whereby the generalized event is the at least one scenario event. In one embodiment, the step of identifying at least one event having at least one event attribute may comprise identifying a first event associated with at least one first event attribute and a second event associated with at least one second event attribute, the step of generalizing the at least one event attribute to define a generalized event may comprise generalizing the at least one first event attribute to define a first generalized event and generalizing the at least one second event attribute to define a second generalized event and the scenario generation process may further comprising the step of connecting the first generalized event and the second generalized event in at least one continuous envelope to create at least one scenario envelope.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1A illustrates a pictorial overview of one embodiment of methods for generating a scenario from a flight log data;

FIG. 21 includes a table of events, decision points, and conditions for example scenario;

FIG. 26 illustrates an entry of one embodiment of a user interaction table; and

FIG. 27 illustrates another entry of one embodiment of a user interaction table.

DETAILED DESCRIPTION OF THE INVENTION

Figure 1B:
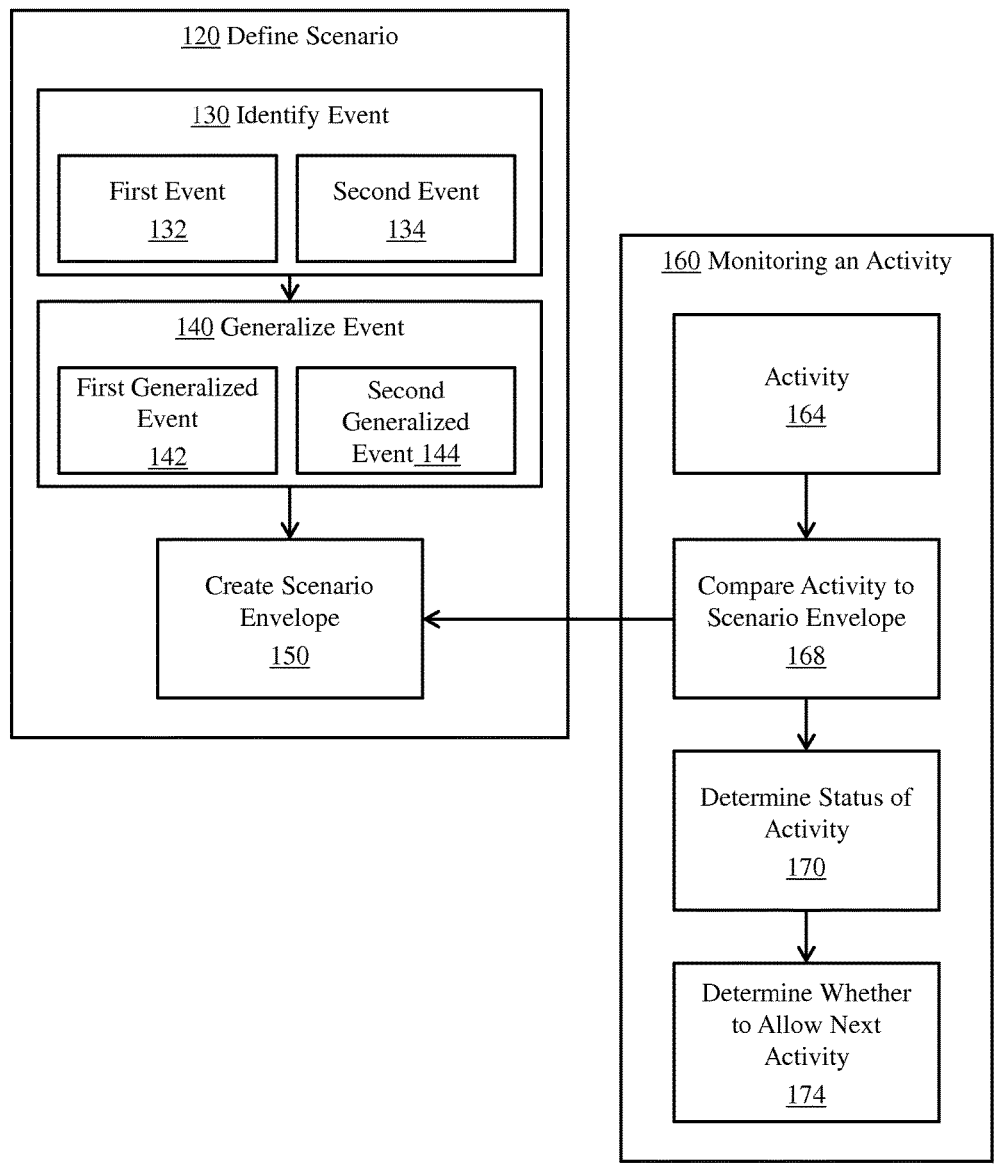
FIG. 1B illustrates a process diagram overview of one example embodiment of methods for scenario generation and monitoring.

Systems and methods to generate and monitor scenarios will now be described in detail with reference to the accompanying drawings. It will be appreciated that, while the following description focuses on a system that generates and monitors pilot training scenarios, the systems and methods disclosed herein have wide applicability. For example, the scenario generation methods and systems described herein may be readily employed with training for facility management, financial trading, business management or any other training for processes that can simulate actual events. Notwithstanding the specific example embodiments set forth below, all such variations and modifications that would be envisioned by one of ordinary skill in the art are intended to fall within the scope of this disclosure.

One General Approach of Systems and Method of Scenario Generation and Monitoring:

The invention described here solves those problems by basing the scenarios on a data source that describes specific events, whether they be actual events or simulated events. For example, the Flight Data Recorder (FDR) in military aircraft describes the actual events of the flight, and the record of a flight in a simulator obviously describes the simulated events. The application of this invention is not limited to aviation, of course—any kind of data source describing events will work. For example, the data source could be an electronic trace from the use of a tactics planning and collaboration workstation like Command Post of the Future, or it could be a log from a game like World of Warcraft, or it could even be a trace of events in human memory. For all of these data sources, the invention described here will leverage the data source and create a scenario in which the participant can act with some degree of freedom.

The central problem in using a data source to author events that recreate the intended situation in a scenario is that the data source will describe every moment in time, and thus, if the system remains faithful to the data source, the participant's control inputs will have no effect. What is needed is a way to systematically create some "wiggle room" around the exact events in the data source that allow the participant's actions to have an effect but that also ensure that the participant winds up in the intended instructional situation. One example embodiment is in the realm of flight safety in a system called CROSSTAFF.

Flight safety is an important aspect of any pilot training curriculum, and experiential training in an interactive environment such as a simulator—that is, active learning—is an essential part of a good flight safety training program. Note, however, that the invention has broad applicability to any sequence of events deemed instructional, not just flight safety.

Because severe mishaps are of great importance to the military aviation community, pilots tend to be familiar with the details of actual mishaps. They often even know the personnel involved. This means that scenarios that are accurate and contextually valid recreations of the mishaps are an excellent way to maintain both trainee engagement and trainee motivation.

On the other hand, those mishaps will never recur in exactly the same form. The location, altitude, heading, equipment status, weather, terrain, or a host of other factors might be different. Thus, for best preventative effect, the experiential component of the training program will need to include scenarios with the same underlying cause but whose circumstances are quite different.

Unfortunately, there are difficulties in creating both kinds of scenarios. For mishap recreations, precise data about the flight are often not available. Instructors are often required to guess at initial conditions and in-session events. For the scenarios involving experiential variation, instructors must creatively yet consistently and accurately imagine other relevant scenarios. As intelligent and creative as instructors are, this is a lot to ask.

A potential solution is to leverage a program called Military Flight Operations Quality Assurance (MFOQA). In this program, the Department of Defense is leveraging lessons learned from the commercial airline industry and exploring ways to use precise data about flights as the basis for training—as well as maintenance, operations, and safety. In particular, precise flight data about the mishaps will be increasingly available, and this will provide a leverage point for experiential safety training. However, with current technology such flight data can only be replayed. Because the flight data specifies every detail at every moment, pilots cannot influence the flight and therefore cannot actively re-fly the mishap. There is value in the replay, but immersing the pilot as an active participant in a scenario that requires decisions and actions at critical points makes the training more relevant, memorable, and effective. Enhancing the process of creating such scenarios may be done from precise flight data. The approach is primarily based on identifying what events and decision points were important during the flight, and on relaxing the requirement that other aspects of the scenario follow the flight log exactly. The approach can be used both to create a scenario that is a quick, effective reproduction of the actual mishap, and also to create scenarios that contain the same kind of mishap but that look quite different from the original.

One source of FDR data and of noteworthy events defined from those data comes from the MFOQA program. In subsequent sections we describe our approach to creating scenarios from these data, and ground the approach with an example. We then discuss elements of a tool suite that can be used to implement the approach, and conclude by discussing how such scenarios can be an effective part of a well-designed training program.

The MFOQA program is working to represent FDR data in a nonproprietary format, and data capture as prescribed by MFOQA is sufficiently comprehensive to allow an aircrew to replay the full flight path of the mission. There are several classes of meaningful events defined for the flight data. A number of system developers provide desktop analysis and playback applications that permit review of all mission aspects, at any point in time, including aircraft performance (e.g., vertical speed), control inputs (e.g., rudder), and system function (e.g., fuel flow) shortly after the flight.

Usually, scenarios in simulators for aircraft do not involve flight logs. Instead, they involve setting initial conditions in the simulator, and as the scenario progresses, the injection of relevant events such as partial equipment malfunctions, the appearance of unknown entities, or the sudden appearance of bad weather.

For reasons discussed above, precise data from flight logs from real or simulated flights can improve this picture, but only if the obstacles presented by precise flight data are overcome. The biggest one is that flight logs leave no room for the trainee to fly. At every moment during the flight, the aircraft from which the flight log originated had a specific location, elevation, heading, velocity, and so on. In the face of this, trainee controls have no effect.

The best that is possible is an annotated replay. This can be valuable, of course. Instructors and other experts can bookmark certain points for convenience in returning later, at which point they can fast forward, pause, comment, rewind, comment again, and so on. Unfortunately, it is also limited to having the trainee passively watch the replay. As discussed below, an opportunity for active learning is an important component of a well-designed training program. What is needed is a way for trainees to actively experience the mishap, and this involves allowing them at least some freedom of movement, so that the controls actually have an effect. It is easy to imagine that small deviations for the actual positions and velocities in the flight log will probably not have a noticeable effect on the circumstances that caused the mishap. The question is, how big can these deviations be without changing those circumstances?

Recognizing the shortcomings of the prior art solutions, the disclosed systems and methods allow trainees to actively experience an actual mishap in an environment that allows them some freedom of movement though the scenario so that the controls actually have an effect and these effects add to the effectiveness of the scenario. They recognized that small deviations for the actual positions and velocities in the flight log will probably not have a noticeable effect on the circumstances that caused the mishap. To implement a solution based on this specific flight-log data, the question is, how big can deviations from this data be without changing the circumstances that led to the mishap and how can you portray these deviations in the resulting scenario. Embodiments of the methods and systems disclosed provide an answer to this question.

For authoring and monitoring a flight-log-based scenario according to embodiments of this invention, there are generally three basic transformations of the original flight that are used in these methods to create a scenario: (1) identification of the key events and decision points, (2) generalizing those key events and decision points, and (3) connecting those generalizations into an envelope. Different aspects of these steps receive more or less emphasis depending on instructor intent: for a quick recreation of the mishap itself, the important activity is to identify the key events and decision points; for creating superficially dissimilar scenarios that have the same underlying circumstances, the generalization step is emphasized. In both cases, the scenario envelope that is generated is used for monitoring.

The embodiment of the invention described here is based on identification of, such as by instructor judgment or predetermined criteria, what events and decision points were important during the flight, and on relaxing the requirement that other aspects of the scenario follow the flight log exactly. The approach can be used both to create a scenario that is a quick, effective reproduction of the actual mishap, and also to create scenarios that contain the same kind of mishap but that look quite different from the original.

One Embodiment of Methods to Generate and Monitor Scenarios:

The systems and methods disclosed are also useful to a broad class of scenario design problems, namely, those for which a trace of actual, simulated, remembered, or imagined events is available. We call the record of this trace the data source. The solution provides a system and method for turning the exact values in the data source, which by themselves would afford a trainee no freedom of movement and no control, since every moment is specified in the data source—into a scenario in which the trainee will have considerable freedom to act and to operate controls.

For authoring and monitoring a scenario based on a data source such as a flight log, there are three basic transformations of the original data that are necessary: identification of the key events and decision points, generalizing those key events and decision points, and connecting those generalizations into an envelope. Different aspects of these steps receive more or less emphasis depending on instructor intent: for a quick recreation of the mishap itself, the important activity is to identify the key events and decision points; for creating superficially dissimilar scenarios that have the same underlying circumstances, the generalization step is emphasized. In both cases, the scenario envelope that is generated is used for monitoring.

For illustration purposes and not for limitation, one embodiment of the present invention is shown in FIG. 1 that shows the general steps involved in the creation of a mishap-related scenario. As shown in FIG. 1, the methods of generating a scenario generally comprise the steps below: identifying key events and decision points, generalization, and creating and monitoring the scenario.

Identifying key events and decision points. FIG. 1 shows the steps involved in the creation of a mishap-related scenario. The original flight path (a) is provided from a data source, which is generally a trace of the behavior of one or more entities. The trace can be of actual events, such as those recorded by a flight data recorder (FDR), or from simulated or otherwise fictional events, such as those recorded in a simulator, or even in human imagination. Events in the data source generally describe the attributes of one or more entities over time. For example, an FDR will record the location, altitude, airspeed, and heading of an aircraft as well as the position of its gauges and controls as well as the position of its control surfaces, the landing gear, and so on. Though it is easiest to think about (and illustrate) event attributes relating to space and time, note that the attributes can be and often are unrelated to spatiotemporal qualities. Thus, a trajectory through the events can be much more than a spatiotemporal trajectory: it can easily cover the hydraulic pressure in the fly-by-wire system, fuel state, or weather.

In the method of this invention, an expert identifies important events in the data source. These events may be instantaneous (as when the hydraulics fail suddenly on an aircraft) or may be extended in duration (as when the cabin pressure on an aircraft slowly decreases.) The events are of two kinds: (1) key events, that is, events that were out of the trainee's control that led up to the incident (the dark blue points in FIG. 1(b)), and (2) decision points, events where the trainee can make a decision that generally will lead to a good or a bad outcome (the light red point in FIG. 1(b)).

The important thing about the identification of key events and decision points is that there is a causal relationship between them—that is, that the simple events that have been identified caused the situation at the decision point. To state this another way, a trajectory through the identified key events (in the broad sense of trajectory described above) will always result in the situation of the identified decision point, and the trainee will always have an opportunity to make the relevant decision.

Generalization. The next step is an important one: to generalize the key events and decision points, shown in FIG. 1(c) by metaphorically turning discrete 3D points into larger 3D spheres. The generalization step is an acknowledgement that an incident will never happen exactly the same way twice—the location, altitude, speed, hydraulic pressure, fuel state, weather, or other aspects of the situation may be different from the original, but it will still lead to the same training-relevant situation. For each key event and decision point, the scenario author specifies what is important for recreating the mishap and what is not.

He or she does this by selecting a set of relevant event attributes, and then by specifying causal constraints for each relevant attribute of each key event or decision point. These are constraints on the value of the event attribute that will allow it to deviate from the value in the data source while still preserving the causal relationship with the decision point. The most common kind of causal constraint is a numerical range, and in the embodiment described here, causal constraints are limited to ranges.

For example, in our aviation example, suppose that altitude has been identified as a relevant event attribute and that the aircraft was at an altitude of 22,937 feet for the second (blue) key event. To cause the mishap situation, it may only have been necessary that the altitude be greater than 15,000 feet in order for the incident to occur. This is a generalization. Identifying factors that had no effect on this particular mishap—say, weather or terrain—is another form of generalization. In this case, the range of the attribute corresponds with its maximum possible range. On the other hand, if some particular aspect of the flight must be exactly the same to recreate the mishap—if it cannot really be generalized—the author will notes that tight causal constraint as well.

The result of generalizing the attributes of an event is that the event is no longer described as a point but a multidimensional shape in event attribute space. In the figures, this is represented as the expansion of a point into a sphere, but of course since there are potentially many relevant event attributes, and since they can describe variables that do not involve space or time, the generalized shape is in reality more abstract and more difficult to illustrate.

However, since causal relationships have been preserved in the generalization process, we can conclude that any generalized trajectory that passes through the shapes as generalized will result in a (generalized) situation that requires the trainee to make the same decision.

Creating and monitoring the scenario. So far, we have identified regions of the data source that represent the key events that caused the situation at the decision point, and we have expanded the data source's specific values for the attributes of those events into a larger shape. This suggests that we are beginning to be able to find a way to create a scenario in which the trainee has some freedom to act in ways that aren't exactly like those in the data source. To create a scenario that provides this freedom and still causes the decision point situation, we need to connect the shapes into a continuous envelope that can be monitored during training. We can be confident that if the trainee says inside the envelope, he or she will encounter the intended situation at the decision point.

Strictly speaking, the surface of the envelope connecting two generalized events E1 and E2 is defined by the points at which it will still be feasible to pass through E2 after having passed through E1. For a simple spatial example, suppose there are two spheres in 3D space through which an aircraft must pass, and further suppose that the aircraft's maximum airspeed is considerably higher than the speed required to reach the second sphere while satisfying whatever time constraints the scenario has. Then, after a pilot has passed through the first sphere, there are many directions he or she might fly for a while—perhaps even in the opposite direction from the second sphere—but still be able to reach the second sphere in time. The envelope for this pilot is the region in 3D space from which it is feasible to fly through the first sphere and still reach the second sphere in time.

Solving for this maximal envelope is in general a difficult, though, because a solution will require estimates of the actual and maximum rates of change of event attributes, and this information is not usually available from the data source. A reasonable and practical compromise is simply to connect the shapes linearly in attribute space, attribute by attribute. This will work assuming that linear increases or decreases to attribute values remain feasible, which is usually the case.

So, for example, suppose events E1 and E2 have been generalized to shapes S1 and S2 respectively and that the distance between their centroids is d (for a suitable definition of distance.) Further suppose that attribute A for S1 has a specified range of l1 to u1 and that its specified range is l2 to u2 for S2. Then, for any distance x (0≤x≤d), the lower boundary of the envelope for attribute A is given by simple linear interpolation $$l_x = l_2 - \frac{x}{d}(l_2 - l_1)$$

and similarly for the upper bound. The simplified envelope, defined this way, is usually contained in the maximal envelope, but the values that are excluded (such as when the pilot might fly in the opposite direction of the second sphere) are usually of more theoretical than practical interest.

In sum: As long as trainees stay within this envelope during the training mission, they will encounter the key set of circumstances involved in the situation to be recreated, and they will arrive at the critical decision points. This can be ensured by having the instructor manually monitor whether the participant remains in the envelope or by erecting invisible barriers around the envelope so that the trainee cannot leave the envelope. When monitored this way, participants will be actively participating in a scenario based on, but not exactly the same as, the original mishap. They will have an opportunity to experience the mishap's circumstances and to take action accordingly. A beneficial side effect is that every use of the scenario will potentially be different. As a result, with repeated runs through the scenario, pilots will encounter a variety of conditions under which the mishap might occur, giving them more experiential variation, and thus a broader experience base. However, as long as they stay inside the envelopes they will be guaranteed to encounter the situation at the decision point that the scenario designers intended.

There are several unique and valuable benefits to the approach to creating scenarios from flight logs that we have described here:

It is both easier and more precise to develop scenarios with a data source as a starting place than starting from scratch. The instructor has something to work from to identify decision points rather than generating them from scratch. Instructors directly identify the important factors for the incident. Recreation of scenarios closely resembling actual events is fast and easy.

Such scenarios extend the "reach" of instructors—tools to manage the process allow instructors to focus on instruction, and not on scenario conditions. This is especially true of scenarios that require a complex schedule of events.

Likewise, when experienced instructors are scarce, scenarios as described here can help less experienced instructors create meaningful training experiences for the pilot. This is especially true of the scenarios that are a result of heavy generalization of causative events and that therefore (on the surface) do not resemble the original mishap.

The generalization of events leads to substantial experiential variation, giving a high "replay value": to the scenarios constructed this way. No two generalized flights will be exactly the same. It is harder for trainees to "game the system," and knowledge and skill transfer should be high.

The methods shown in FIG. 1A are also depicted in the process diagrams in FIG. 1B. As shown, the methods to define a scenario 120 comprise identifying at least one event at 130. Here the events comprise a first event 132 and a second event 134. The events may have at least one event attribute. At 140, the events are generalized to create generalized events. Here, the first event is generalized at 142 and the second event is generalized at 144. At 150, the generalized events are used to create a scenario envelope. The scenario envelope may be created by connecting the first generalized event and the second generalized event in at least one continuous envelope to create at least one scenario envelope. As discussed herein, the event attribute may comprise a decision point or a key event attribute.

Also illustrated in the embodiment of FIG. 1B are optional methods to monitor an activity. As show, the method of monitoring an activity 160 may comprise monitoring an activity 164 having an activity attribute and at 168 comparing the activity attribute to an event envelope 150 to determine a status of the activity relative to the event envelope at 170. The generalized event 140 may be defined by a generalized event attribute. At 174, the methods may determine whether to allow a next activity. Step 168 of comparing the activity attribute to determine a status of the activity relative to the event envelope may comprise comparing the activity attribute to a scenario envelope to determine a status of the activity relative to the scenario envelope and the scenario envelope 150 may be defined by a first generalized event 142 and a second generalized event 144 being connected in a continuous envelope. The continuous envelope may be defined by defining a first shape of the first generalized event in an attribute space, defining a second shape of the second generalized event in the attribute space and connecting the first shape and second shape linearly in the attribute space.

Figure 2:
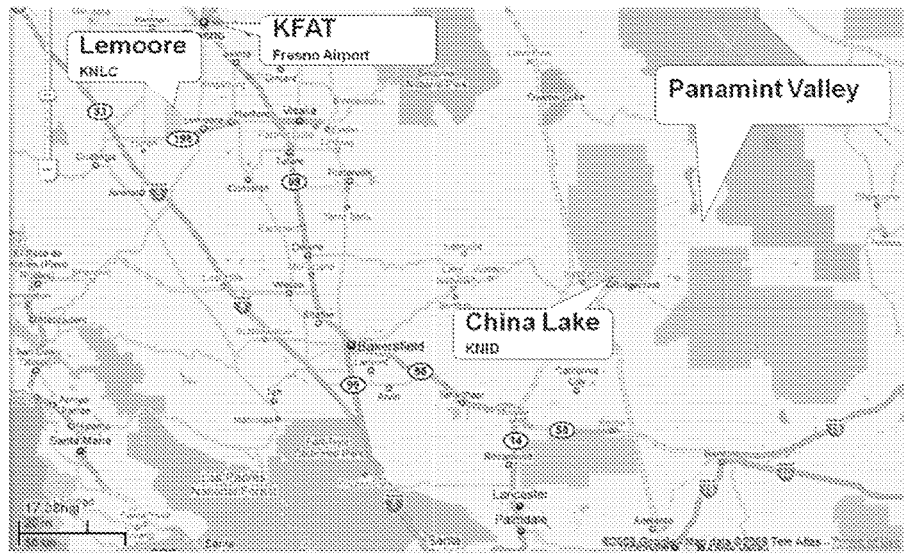
FIG. 2 illustrates one embodiment of a map over which an example flight mishap occurred.

One Embodiment of Methods to Generate and Monitor Scenarios, a CROSSTAFF Embodiment:

One embodiment of the systems and methods for scenario generation and monitoring can be illustrated with a realistic but partially fictional flight safety example from a CROSSTAFF embodiment centered around a pilot's misjudgment of the effects of low fuel on trying to land in worsening weather. In this example, the pilot was returning to Lemoore Naval Air Station from a low altitude training mission in the Panamint Valley. He was somewhat low on fuel, and he had reports that the visibility ceiling at Lemoore was dropping rapidly. Rather than landing safely at China Lake, though, he pressed ahead to Lemoore where he took off from. On reaching Lemoore, he discovered that the cloud ceiling was less than 200 ft., but he did not have enough fuel to land anywhere else. After an attempted approach on runway 32L he switched to an approach on runway 32R. He was unaware that the runway lighting was unusual on runway 32R, and as a result he missed the runway and brought his left wing in contact with the ground and right wheel in the mud. FIG. 2 shows a map of the scenario.

Obtaining actual data, step 1. The original flight path FIG. 1A(a) is provided from FDR data and MFOQA events, either from the actual aircraft or from a re-creation in a simulator. The FDR data and MFOQA events describe the exact state of the aircraft, its instruments, and its controls during the ill-fated flight.

Although the above example for illustration includes obtaining an actual data set by downloading it from a FDR, means to obtain an actual data set can include means such as, but not limited to, receiving data over a communication network, translating logs into a data set, receiving data from a simulator, receiving data stored on storage media or any other method of sharing or playing back data.

To turn this mishap into a scenario, we start with the FDR log and the identified MFOQA events from the flight. These tell us the exact position, heading, and velocity of the aircraft as well as a number of internal variables such as remaining fuel.

Identifying key events and decision points, step 2. On the flight path, the author identifies key events of two kinds: (1) events that were out of the pilot's control that led up to the incident (the dark points in FIG. 1A(b)), and (2) pilot decision points that were key to causing or avoiding the incident (the light point in FIG. 1A(b)).

An Example of Key Events and Decision Points May be Seen in the First Column of FIG. 21 Table 1.

Although the above example for illustration includes means for identifying events and decision points through the manual use of a scenario author, means to identify at least one key event and one decision point from the actual data set can include means such, as but not limited to, automatically recognizing events and decision points from alarms or other triggers, automatically recognizing event and decision points as a deviation from a baseline or having an entity in the event identify the events and decisions points.

Generalizing key events and decision points, step 3. The next step is to generalize the key events and decision points, shown in FIG. 1A(c) by metaphorically turning discrete 3D points into larger 3D spheres. The generalization step is an acknowledgement that a safety incident will never happen exactly the same way twice—the location, altitude, speed, or other aspects of the situation may be different from the original mishap, but it will still be the same kind of mishap. For each event and decision point, the scenario author specifies what is important for recreating the mishap and what is not.

Suppose, for example, that the aircraft was at an altitude of 22,937 feet for the second (blue) key event. To recreate the mishap, it may only have been necessary that the altitude be greater than 15,000 feet in order for the incident to occur. This is a generalization. Identifying factors that had no effect on this particular mishap—say, weather or terrain—is another form of generalization. If some particular aspect of the flight must be exactly the same to recreate the mishap— if it cannot really be generalized—the author notes that as well. Other space-and-time-related specifics can also be generalized, as might specific states of instruments, controls, and other aircraft in the scenario. In effect, generalization turns specific events and decision points in the MFOQA log into 4D regions in space-time.

The generalized conditions for those decision points may be seen in the second column for Table 1 at FIG. 21.

Although the above example for illustration utilizes a manual means to generalize the event and the decision point, it is understood that the means to generalize can include, but not be limited to, automatically generalizing events and decision points given predefined rules based on the event and decision point characteristics, automatically generalizing events and decision points based on a mix of manual and automatic input or having an entity in the event generalize the events and decisions points.

The events in the first column of FIG. 21 Table 1 are then mapped to the flight timeline, specific ranges of each event attribute are provided for the conditions in the second column, and these ranges are connected into a behavioral envelope. For convenience and efficiency, the instructor also may opt to edit out any portion of the timeline that is unnecessary. At this point, the scenario is ready for a new trainee to fly.

During the execution of the scenario, the instructor ensures that the pilot stays within the scenario envelope either by alerting the trainee or by creating invisible barriers that the simulator cannot fly through. In this manner, the trainee is guaranteed to encounter all the key causal events, and is guaranteed to be in a position to make the key decision, in this case to land at China Lake or to continue on to Lemoore.

Creating the scenario, step 4. The final step, FIG. 1A(d), connects those 4D regions into a continuous envelope. This constitutes the scenario. As long as pilots stay within this envelope during the training mission, they will encounter the key set of circumstances involved in the mishap, and they will arrive at the mishap's critical decision points. They will be actively flying in a scenario based on, but not exactly the same as, the original mishap. They will have an opportunity to experience the mishap's circumstances and to take action accordingly. A beneficial side effect is that every use of the scenario will potentially be different. As a result, with repeated runs through the scenario, pilots will encounter a variety of conditions under which the mishap might occur, giving them more experiential variation, and thus a broader experience base.

Figure 3:
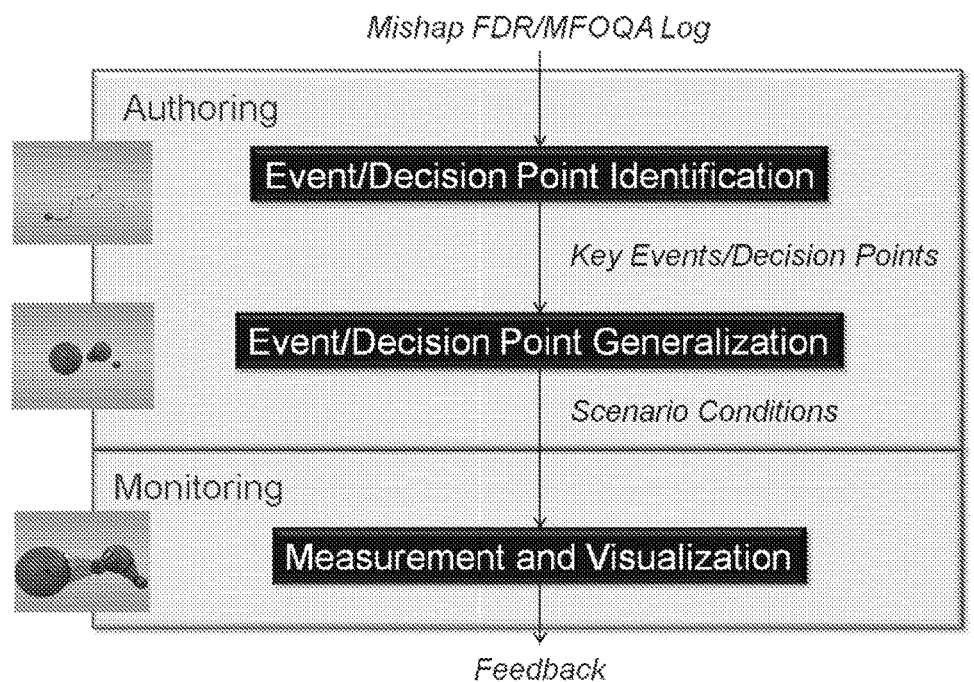
FIG. 3 illustrates a functional overview of one embodiment of a suitable computer program product capable of executing the described method.

As FIG. 3 shows, CROSSTAFF has tools of two kinds, those for authoring and those for monitoring. The tools for authoring can be further subdivided into tools for identifying key events and decision points and tools for generalizing those decision points. Tools structured this way match exactly the approach outlined earlier, and in FIG. 3 this is shown graphically with icons representing FIGS. 1A(b), (c), and (d) adjacent to the tools' functions.

There are two different kinds of scenarios that these tools can generate. First, they assist instructors in the rapid creation of scenarios that are reasonably faithful to the mishap as described in the flight log. For this kind of scenario, instructors simply choose sensible waypoints (and other event points, if necessary), and the tools supply a little spatial and temporal "room" around them. The amount of spatial and temporal "slack" is a small and is the same for each event and decision point. Normally this is all that is required, but instructors can adjust spatial, temporal, and other constraints beyond this point if circumstances warrant. The result is a scenario that recreates the mishap from the flight log that requires minimal effort to construct.

The other kind of flight log based scenario is one that has the same underlying cause as the real mishap, but that on the surface looks different to the trainee. The instructor creates these by visiting each key event and decision point, and by generalizing it as much as possible. For example, the instructor might decide that, for a given event, terrain could change radically; an indent that involves Naval Air Stations at Lemoore and China Lake on the West Coast could instead involve Naval Air Stations at Oceana and Patuxent River on the East Coast. Similarly, the instructor might indicate that weather, fuel, temperature, equipment status, or other parameters can vary widely. From these generalizations, a scenario is constructed by choosing legal values for them at random, and this normally results is a very different-looking scenario, even though the important aspects of the underlying events and decision points have been preserved: trainees will find themselves in the same safely-related situation.

Figure 4A:
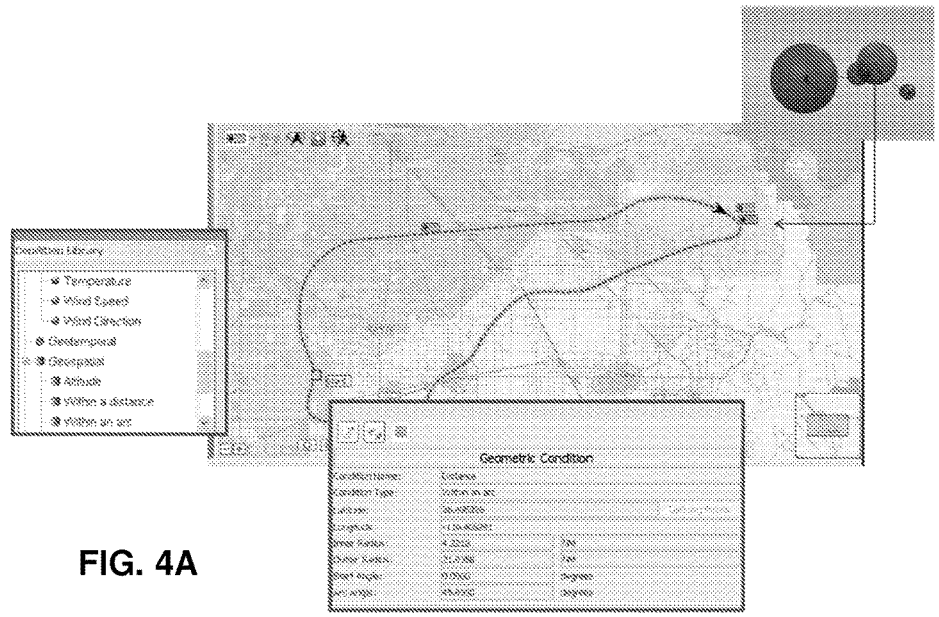
FIG. 4A illustrates example screen shots of one embodiment of a scenario generation system showing an authoring screen shot.

The authoring screen, illustrated in FIG. 4A, shows the map with an overlay representing the flight path. The points on the flight path key events and decision points, the details of which are specified in the pane below the map.

As discussed above, one example of suitable means to create the scenario includes connecting the generalized key events and decision points to define a continuous envelope of scenario variables that encompass the generalized key events and decision points. Other means to create the scenario and to connect the generalized key events and decision points are also contemplated.

Figure 4B:
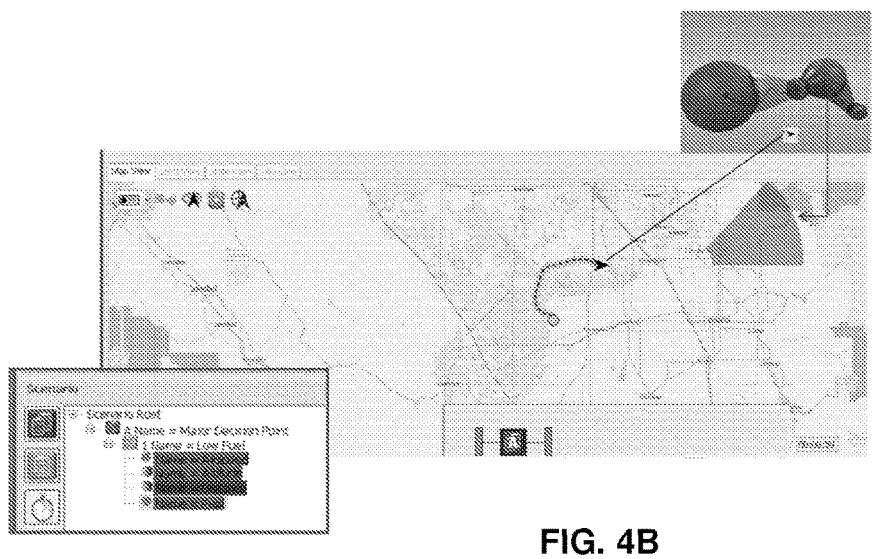
FIG. 4B illustrates example screen shots of one embodiment of a scenario generation system showing a monitoring screen shot.

Monitoring the scenario, optional step 5. FIG. 4B shows a corresponding monitoring screen. Here, the Gantt-chart-like representation indicates that the key events have a number of components whose timing is interrelated. This kind of event representation for a scenario will is useful, for example, when an instructor or a simulator operator needs to recreate a complicated series of equipment failures with certain constraints on timing. Other monitoring screens show higher-level progress through the scenario.

One Embodiment of a Scenario Generation and Monitoring System:

The various method embodiments of the scenario generation and monitoring system can be implemented in hardware, software, or a combination of hardware and software. Any kind of computer/server system(s), or other apparatus adapted for carrying out the methods described herein, is suited. A typical combination of hardware and software could be a general-purpose computer executing a sequence of program instructions for carrying out the steps of the methods described herein, assuming all required data for processing is accessible to the computer, which sequence of program instructions may be embodied in a computer program product comprising a non-transitory computer-readable medium storing the program instructions. The term non-transitory computer-readable media or medium comprises all computer-readable media or medium with the sole exception of a transitory, propagating signal. Alternatively, a specific use computer, containing specialized hardware for carrying out one or more of the methods of the invention, could be utilized.

Embodiments of the present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or reproduction in a different material form. A computer program can be written in any form of programming language, including compiled or interpreted languages, and it can be deployed in any form, including as a stand-alone program or as a module, component, subroutine, or other unit suitable for use in a computing environment.

Figure 20:
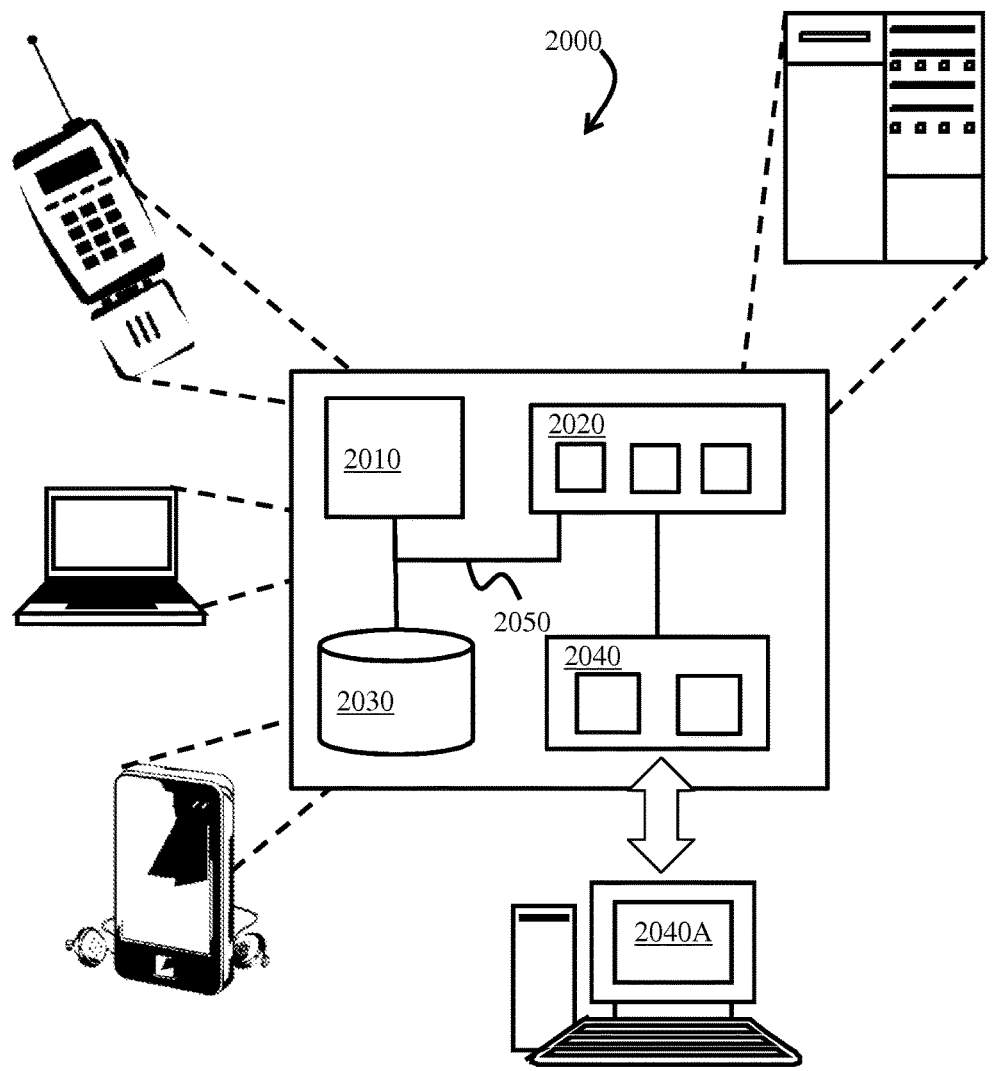
FIG. 20 illustrates an example embodiment of a processor based system according to one embodiment of the invention.

FIG. 20 is a schematic diagram of one embodiment of a general computer system 2000. The system 2000 can be used for the operations described in association with any of the computer-implemented methods described herein. The system 2000 includes a processor 2010, a memory 2020, a storage device 2030, and an input/output device 2040. Each of the components 2010, 2020, 2030, and 2040 are interconnected using a system bus 2050. The processor 2010 is capable of processing instructions for execution within the system 2000. In one implementation, the processor 2010 is a single-threaded processor. In another implementation, the processor 2010 is a multi-threaded processor. The processor 2010 is capable of processing instructions stored as a computer program in the memory 2020 or on the storage device 2030 to display information for a user interface on the input/output device 2040.

The memory 2020 stores information within the system 2000. In some implementations, the memory 2020 is a computer-readable storage medium. In one implementation, the memory 2020 is a volatile memory unit. In another implementation, the memory 2020 is a non-volatile memory unit.

The storage device 2030 is capable of providing mass storage for the system 2000. In some implementation, the storage device 2030 is a computer-readable storage medium. In various different implementations, the storage device 2030 may be a floppy disk device, a hard disk device, an optical disk device, or a tape device. The program product may also be stored on hard disk drives within the computer or it may be located on a remote system such as a server, coupled to processing unit, via a network interface, such as an Ethernet interface.

The input/output device 2040 provides input/output operations for the system 2000 and may be in communication with a user interface 2040A as shown. In one implementation, the input/output device 2040 can include a keyboard, touchscreen and/or pointing device. In another implementation, the input/output device 2040 includes a monitor or other display unit for displaying output and graphical user interfaces.

Suitable processors for the execution of a program of instructions include, by way of example, both general and special purpose microprocessors, and a sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

Some embodiments described may be implemented in digital electronic circuitry, or in computer hardware, firmware, software, or in combinations of them such as but not limited to digital phone, cellular phones, laptop computers, desktop computers, digital assistants, iPods, iPads, servers or server/client systems.

Some embodiments may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

Some embodiments of the computer system may include clients and servers. A client and server are generally remote from each other and typically interact through a network, such as the described one. The relationship of client and server arises by virtue of computer programs running on the respective computers and having a client-server relationship to each other.

Figure 5:
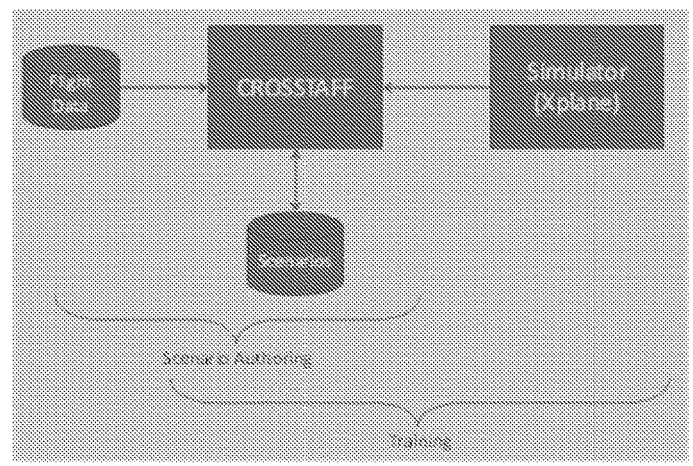
FIG. 5 illustrates a top level system architecture of one embodiment of the CROSSTAFF systems and methods.

The top level system architecture of one embodiment of the CROSSTAFF system embodiment is shown in FIG. 5. During scenario authoring, CROSSTAFF reads in flight data, creates scenarios and saves the scenarios for later use. During training, CROSSTAFF reads in a scenario and connects to a simulator to get real time flight data.

Figure 6:
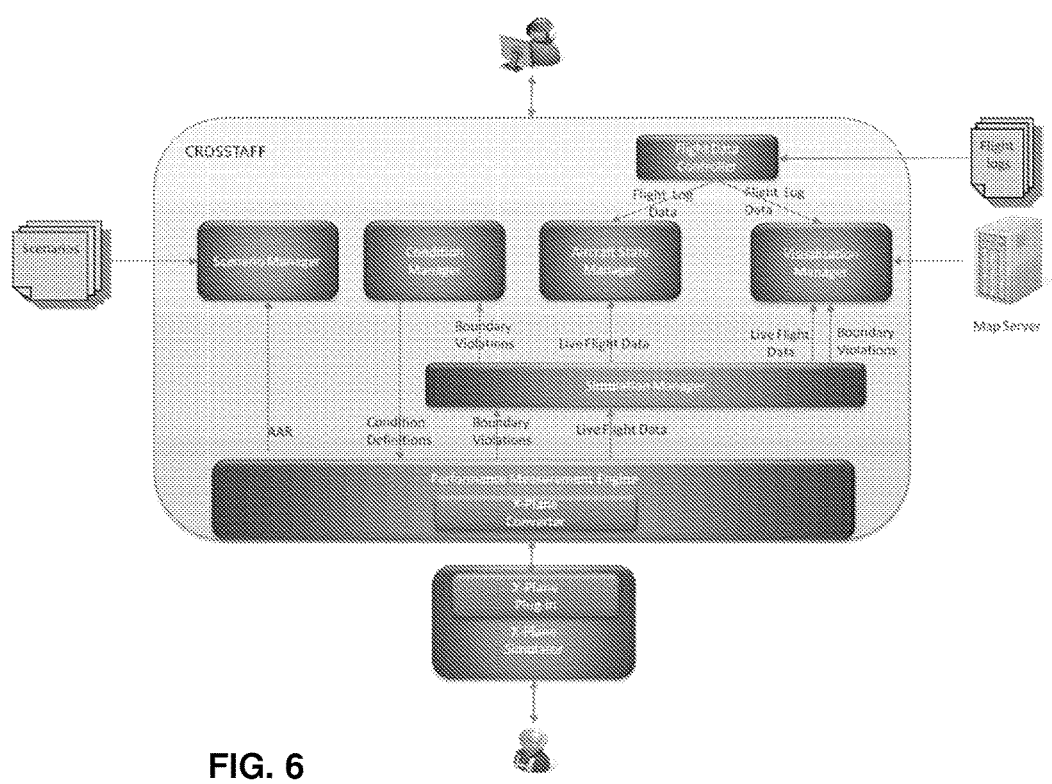
FIG. 6 illustrates a functional diagram of one embodiment of the CROSSTAFF components.

FIG. 6 shows the CROSSTAFF components. The architecture has five main components. Each component (except the Condition engine) has a dual role and has different behaviors depending on if CROSSTAFF is being used for scenario authoring or training monitoring. Components of the CROSSTAFF architecture comprise the: visualization component, scenario management component, decision management component, flight data management component and condition engine component.

Visualization provides a map visualization with standard navigation controls (like pan and zoom), displays the flight data and can preview condition satisfaction on the flight path (for example the flight path displays red where the condition is not satisfied and green where it is). During training monitoring, the visualization shows the location of the aircraft from the simulation and visually shows the satisfaction state of the geometric conditions (green if the condition is satisfied and red if it is not).

Scenario Management provides for the basic editing and save/restore of scenario data.

Decision Management provides for the creation and editing of decision points and conditions. Some of the condition authoring is done on the map (such as the geometric conditions) and the condition preview uses the visualization component. During training monitoring this component determines which conditions should be evaluated using real-time data from the simulation environment and the results shown using the visualization component.

Flight Data Management manages the flight data both during authoring and training monitoring.

Condition Engine is loaded with conditions from the decision management component and collects the necessary data from the simulation environment. The condition engine then evaluates the incoming simulation data against the active conditions and assesses the satisfaction of the condition. The state of the condition is then sent to the decision management component to determine the impact of the condition state (in some cases this will change the visualization shown on the map).

One embodiment of CROSSTAFF is a desktop Java application. The user interface is assembled using the SWING widget toolkit. It is built out of the following components, seen in FIG. 6:

The Performance Measurement Engine (referred to as the PME from here on) collects flight data from flight simulators and calculates whether conditions defined by CROSSTAFF are being met. It has a separate connector for each simulator it can collect data from. The PME runs in a separate process space from CROSSTAFF proper and communicates with it through Web Services using SOAP.

The X-Plane Plug-in uses the X-Plane software development kit (SDK) for the X-Plane simulator. It runs within X-Plane. It samples data at a regular interval from the simulator while it's running. It outputs the data it samples into a socket that the PME connector listens to in an XML format. It also outputs into a file in the same format. Each XML element contains a timestamp, latitude and longitude of the aircraft and optionally any other data that is available from a flight log or a simulator output such as the status and health of the airplane (e.g. altitude, airspeed, fuel level) and environmental data (e.g. wind speed, ceiling).

The simulation manager is responsible for gathering the aircraft data and the status of the condition variables during the simulation from the PME. It does this by communicating with the PME Web Service. Before the simulation starts, the simulation manager sends a list of the conditions to the PME that it wants the PME to monitor as well as all the aircraft data it needs. Once the simulation starts, the simulation manager polls the PME at a regular interval (once a second by default) for this information.

The flight data controller serves flight log data to the visualization manager and the aircraft state manager. It loads the flight data from a file generated by the X-Plane plug-in. The flight data controller retrieves the log file from the file system, reads the xml content of the file and loads it into memory as a sequential list of FlightData java objects. The other components query the flight data controller to extract flight data. A component can either request the entire flight data or request the data pertaining to a particular time interval.

The visualization manager is responsible for displaying a geographical map and the flight path. To display the map, it contacts a local or remote OpenStreetView map tile server and retrieves tiles in png format using the latitude and longitude of the first data point in the flight path and a default zoom level. It then displays these tiles in the UI. The flight path is drawn on top of the map using Java's 2D graphics library. In authoring mode the visualization manager draws the flight map from the data it gets from the flight data controller. During the simulation the flight path is updated live on the map from the data that comes from the simulation manager.

The condition manager has a condition library that contains condition definitions stored in an xml file. It is loaded and de-serialized into a Java class using an XML decoder. In general, each condition type is defined by a display name, unit and a name. the name is used for mapping the condition to the data type coming from the simulator. For example, the fuel level condition could be represented as follows: display name="fuel", units="lbs." and name="m_fuel_data". The conditions themselves (i.e the instances and not the definitions), with the exception of the geospatial ones, are specified using an expression language that supports the following operators: equal, not equal, less than, greater than and between. For example, the author can specify that the pilot's fuel must "Between 5000 and 6000 Lbs.". Geospatial conditions are defined by specifying an area on the map. For example, a circle is defined by a latitude, longitude and a radius in nautical miles. During simulation monitoring, the condition panel uses the data from the Simulation manager and updates each condition's status at each time interval.

The aircraft state manager displays the aircraft data. During the simulation, it retrieves the data from the simulation manager at each time interval and updates the GUI. During the authoring phase, it displays aircraft data from the flight log it retrieves from the flight data controller.

The scenario manager stores scenarios in xml files. The files contain information such as but not limited to: one or more flight log file paths or database identifier, a tree of decision points, event and conditions, the list of aircraft state variable that is visible on the state condition panel and a list of map annotations such bookmarks and waypoints.

Figure 7:
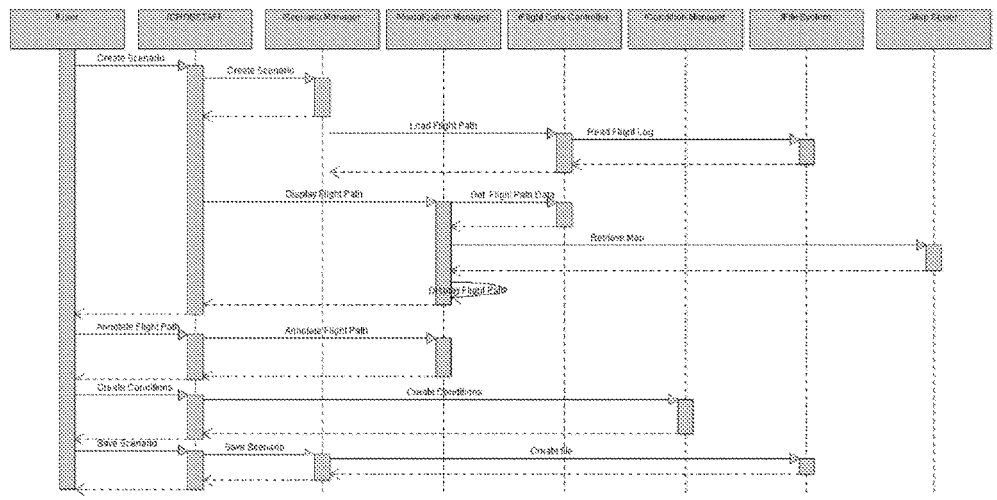
FIG. 7 illustrates a typical scenario creation sequence according to one embodiment of methods of scenario generation and monitoring.

Authoring sequence diagram. FIG. 7 shows a typical scenario creation sequence. The CROSSTAFF user starts by requesting the creation of a scenario from the Scenario Manager. In this case the request includes the name of the flight log path. The scenario manager creates the scenario context in memory and requests the flight data controller to load the flight log. The flight data controller retrieves the log file from the file system, reads the xml content of the file and loads it into memory as a sequential list of FlightData java objects. CROSSTAFF then requests the visualization manager to display the flight path. The visualization manager retrieves the flight path data from the flight data controller. First it determines the latitude and longitude of the first data point and retrieves the corresponding map tiles from the OpenStreetView map server. It then displays the map tiles in the UI and draws the flight path on top. The map is annotated using the visualization manager by adding bookmarks, decision points and event points. The Java 2D graphics library is used to place these icons on the map. The conditions are created using the condition manager. Finally all of the work done is saved into a scenario file using the scenario manager.

Figure 8:
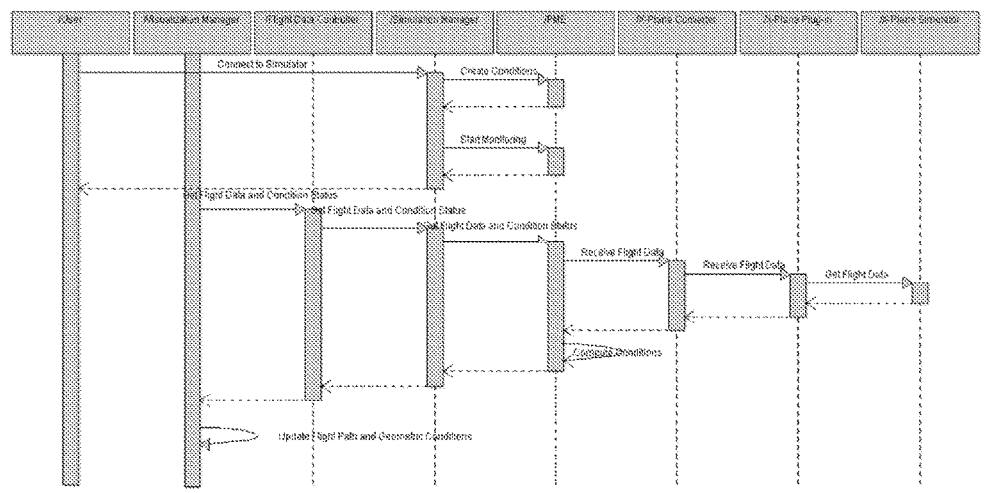
FIG. 8 illustrates a typical sequence of events during a simulation monitoring according to one embodiment of methods of scenario generation and monitoring.

Monitoring sequence diagram. FIG. 8 displays the sequence of events during a simulation monitoring. The user requests CROSSTAFF to start monitoring. This request is passed onto to the simulation manager. The simulation manager retrieves the conditions from the scenario manager and sends them to the PME web service in a format that the PME understands. It then starts a separate execution thread that keeps on polling the PME for simulation flight data and condition variable status. When the PME is polled for data it retrieves the simulator data from its collector. The collector listens for flight simulator data from the simulator plug-in asynchronously through a socket. The simulator plug-in sends the data to the socket as it periodically samples the simulator. Once the data percolates all the way back to the PME, it analyzes the data to check whether any of the conditions have been violated and send all this information back to the simulation manager through the web service. The simulator manager updates the visualization manager with the flight data and the condition status. The visualization manager then updates the map and the flight path on the UI.

Figure 9:
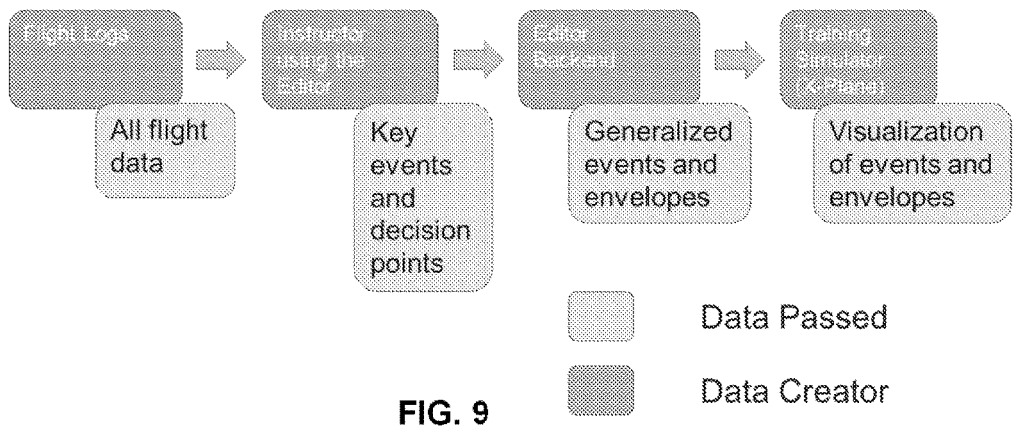
FIG. 9 illustrates the data flow in one embodiment of the CROSSTAFF.
Figure 10:
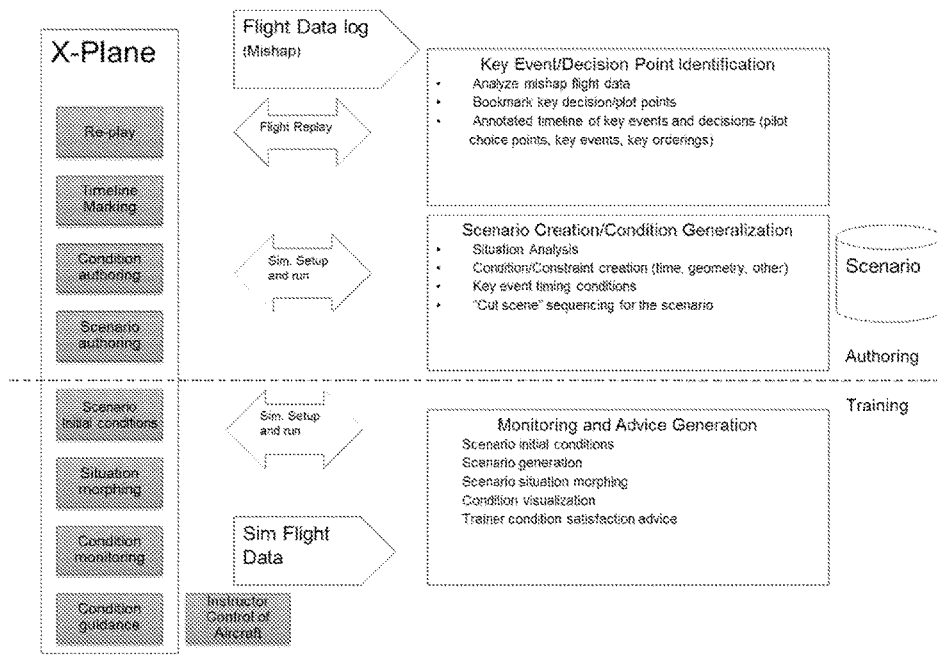
FIG. 10 is a and a functional diagram of the XPLANE tool.

The data flow in the tool can be seen in the FIG. 9, and a diagram of the XPLANE tool can be found in FIG. 10.

Examples of selling points and advantages for scenario authors over existing methods include but are not limited to: automatic and precise starting point (MFOQA), structured and streamlined way of finding out what the incident applies to, a structured way to get experts to identify the class of problems of which incident is an instance, automatic development of training scenario and training events—no monitoring required, training event will occur if training is within envelope, flexible scenario development with easy parameterization and experiential variation for trainees where trainees don't know exactly what will happen within the scenarios which will allow for ease of scenario re-use.

The system leverages the data capture and replay capabilities of Xplane, as well as custom-created Python-based plug-ins to expand Xplane's interoperability with CROSSTAFF.

Figure 11:
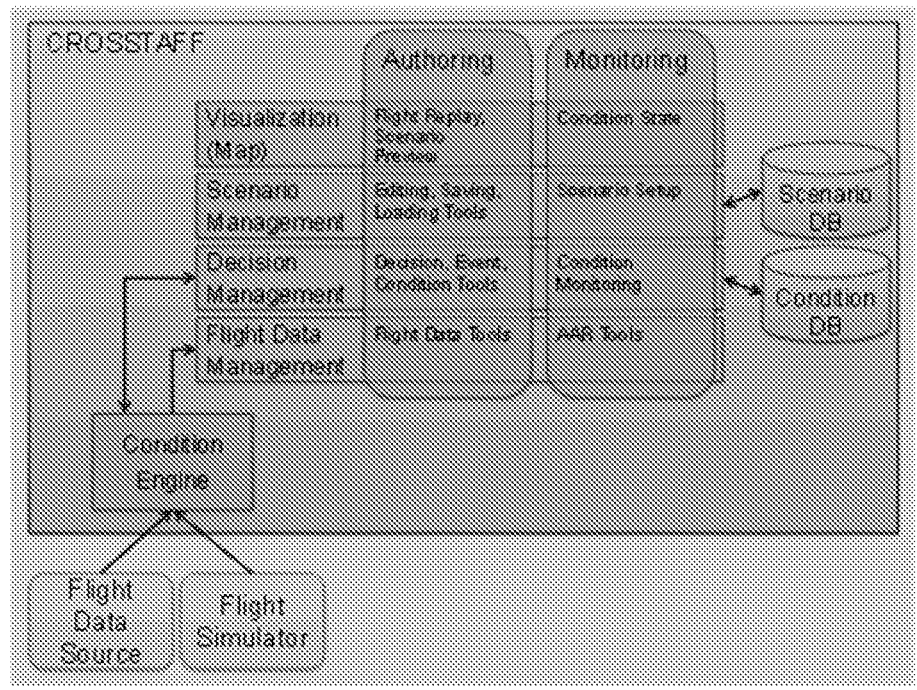
FIG. 11 is an architectural illustration of various data sources and databases of one embodiment of a scenario generation and monitoring system.

The CROSSTAFF architecture also contains several data sources and databases as shown in FIG. 11. These include: data source: flight data source, data source: flight simulator, database: scenario db and database: condition db. Data source: flight data source—CROSSTAFF can import an archived flight data source to be used during scenario creation. Data source: flight simulator—CROSSTAFF can connect to a simulation environment (XPlane is currently implemented) to obtain real time simulation data for training monitoring. Database: scenario db—CROSSTAFF can store scenario definitions and restore them for use at a later time or by another training team. Database: condition db—CROSSTAFF can save and restore condition definitions so that they can be shared across teams and scenarios.

Scenario model. CROSSTAFF uses a scenario model that is made up of the following elements: scenario, events and conditions. Scenario is the top level element that describes a scenario. A scenario is composed of a number of events, both the key events out of the pilot's control and decision points where the instructor (or scenario author) expects that the pilot will need to make a critical decision. Each event can have a set of attributes associated with it. An attribute that has been given a specified range of values is called a condition. Each condition describes the bounds of a particular aspect of the flight environment at that time. Because conditions are causally liked to the eventual situation and decision point, generally all of the conditions of an event should be true for the pilot to get the necessary experience intended for that time in the scenario.

Figure 12:
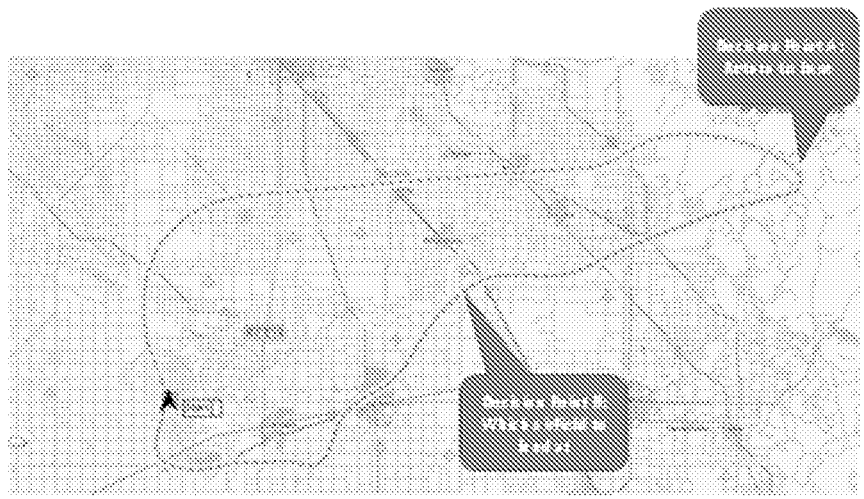
FIG. 12 illustrates one example of how events may be selected utilizing the CROSSTAFF system.

During authoring time, the instructor or scenario author analyzes the flight data and determines when during the flight important causal events happen, including those points at which the pilot needed to make important decisions. The scenario author creates these events in the CROSSTAFF tool and they are saved along with the scenario. An example of this is shown in FIG. 12. In this scenario there are events related to fuel state, weather, and position with respect to landing opportunities, and there is a decision where the pilot needs to make a decision to return to base at decision point A because of fuel level. Then at decision point B, the pilot needs to decide if they are going to continue to the airfield where they took off from (which has deteriorating weather conditions), or to divert to another airfield.

For each of the decision points that have been defined in the scenario, the scenario author can define a set of conditions that describe the bounds of the desired state of the aircraft or the simulation environment. CROSSTAFF supports a number of event attributes including but not limited to: health and status, environment and geospatial. Examples of health and status attributes include but are not limited to: fuel, engine state, control surface, ground speed, true airspeed and indicated airspeed. Examples of environment attributes include but are not limited to: ceiling, visibility, temperature, wind speed and wind direction. Examples of geospatial attributes include but are not limited to: altitude, within a distance to a point, within an arc, position and heading.

For each condition defined on an attribute, the following information may be required: attribute name, attribute type (from the list above), variable—this is the simulator data value that will be used with the condition, operator—this is a logical operator used to determine if the condition is satisfied (for example is the variable between the values given) and Operand 1 and 2—these are the bounds of the condition.

Figure 13:
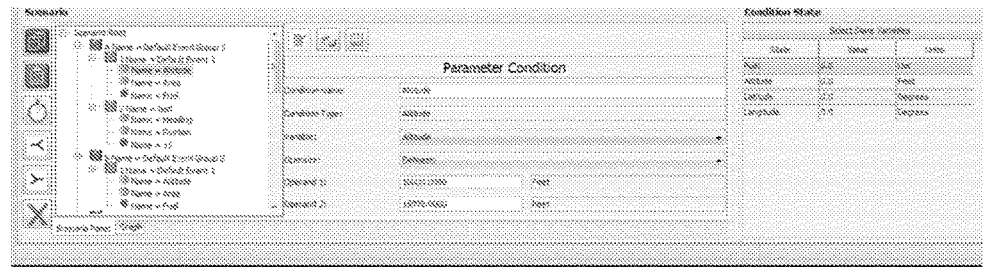
FIG. 13 illustrates the portion of one embodiment of the a user interface used to create and edit conditions.
Figure 14:
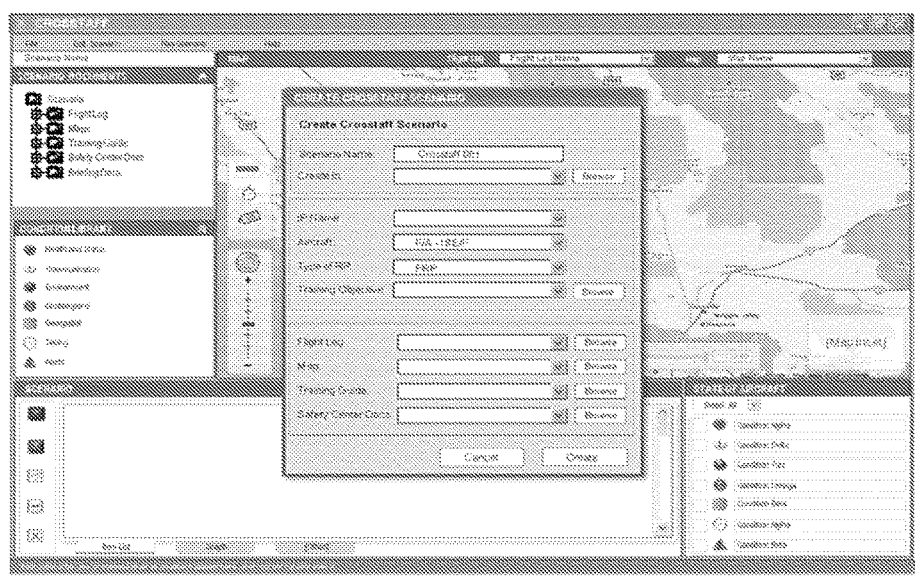
FIG. 14 illustrates a view of one embodiment of the user after the author specifies scenario information.
Figure 15:
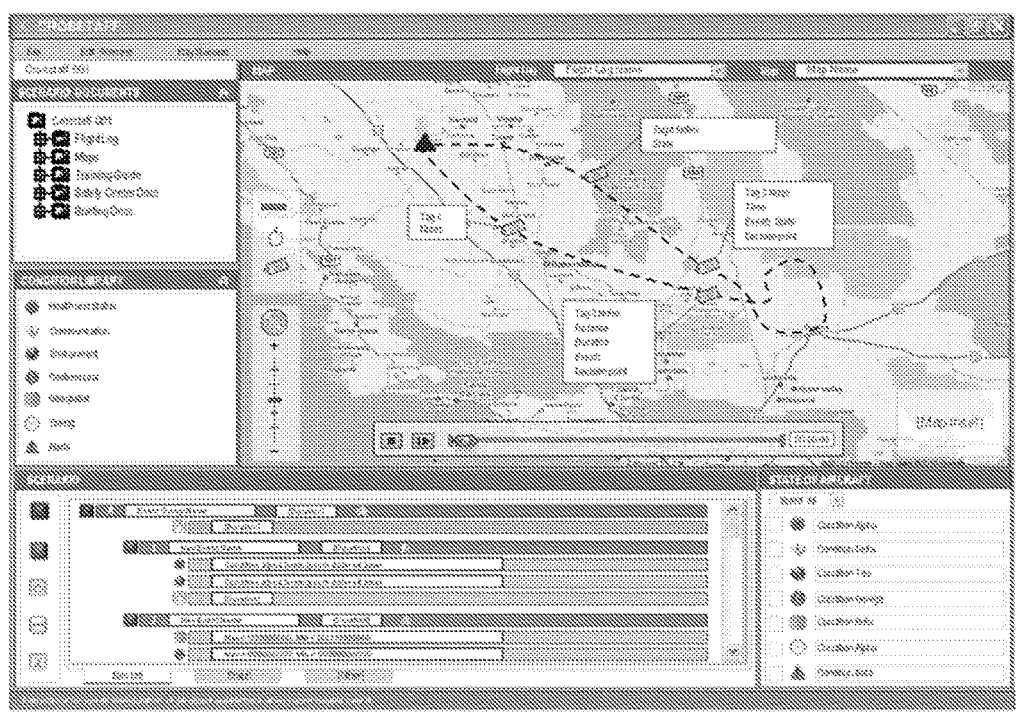
FIG. 15 illustrates another example of a user interface for one embodiment of CROSSTAFF.
Figure 16:
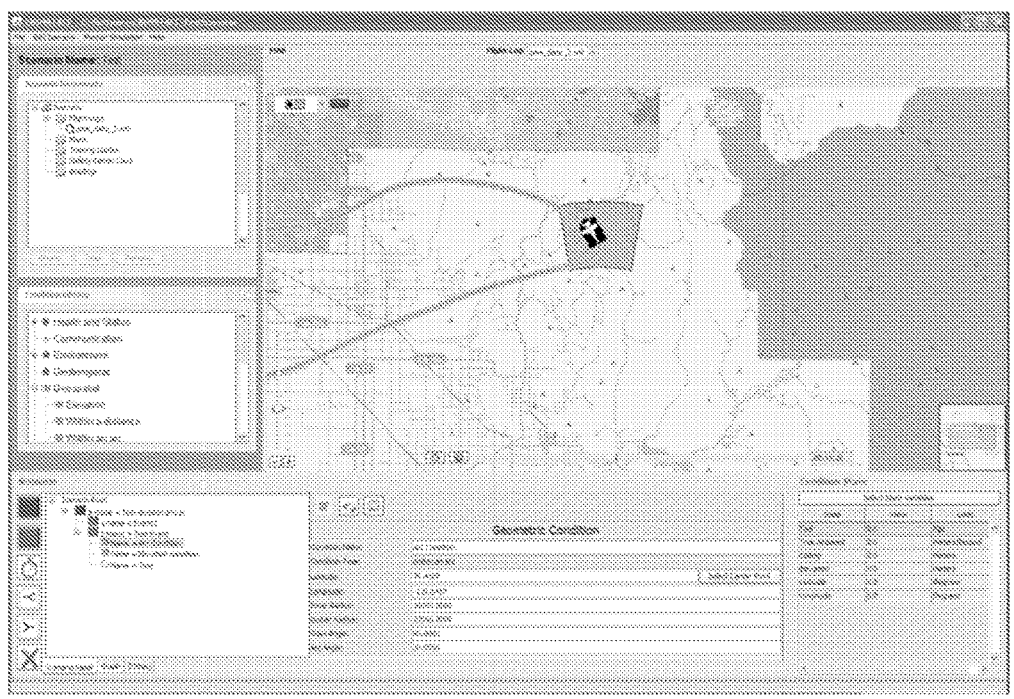
FIG. 16 illustrates another example of a user interface for one embodiment of CROSSTAFF.
Figure 17:
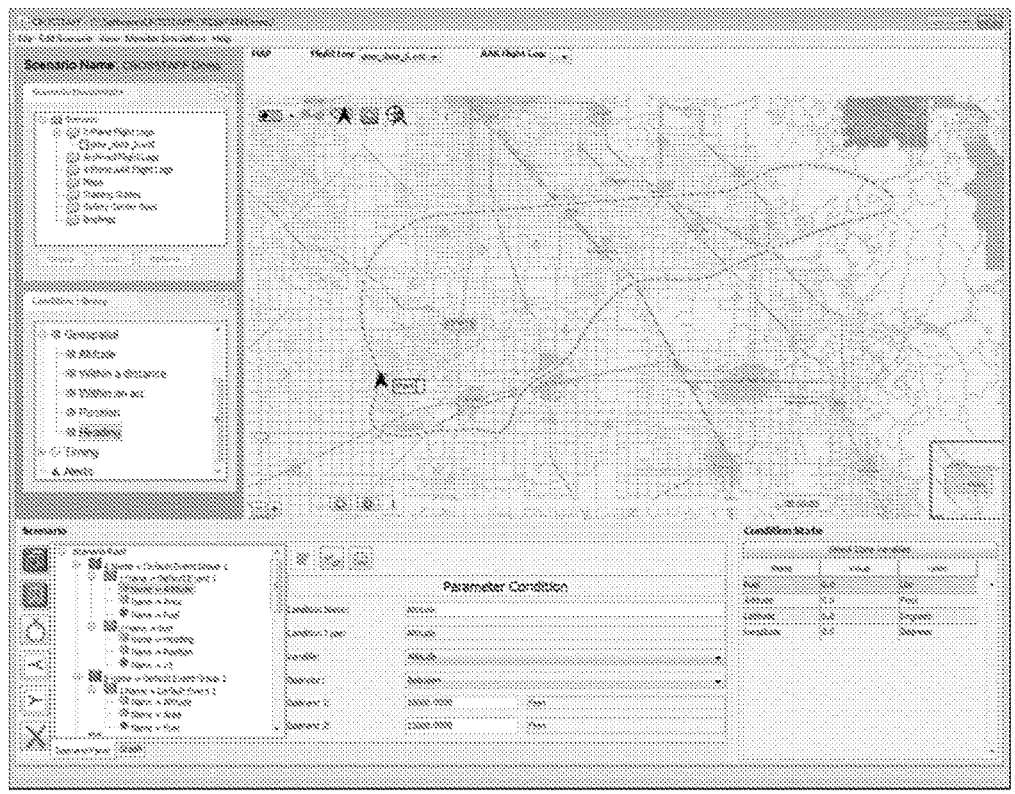
FIG. 17 illustrates another example of a user interface for one embodiment of CROSSTAFF.

FIG. 13 shows the lower portion of the CROSSTAFF user interface that is used to create and edit conditions. The left hand panel shows the hierarchy of decision points and conditions that have been defined. The center panel shows the information associated with an altitude condition. In this case, the condition has the altitude value between 10,000 and 15,000 feet.

CROSSTAFF system architecture is divided into two distinct but similar tools, the scenario authoring tool, and instructor's flight monitor.

The scenario authoring tool (SAT) provides SME(s), instructors, or safety center experts the ability to identify key events and decision points in a flight replay, and to output a simulator scenario file generalized to use versions of these key events and decision points to define a flyable scenario, which is then monitored in the instructor's flight monitor (IFM) to be sure the trainee experiences the conditions leading to a mishap.

One embodiment of the CROSSTAFF SAT has the following functional requirements (i.e., what functions will the operator accomplish using the interface?): identify critical and decision points (key events) in the flight log, define conditions and constraints (generalization) and specify and apply to training scenario. The following informational requirements (i.e., what information and data are needed to accomplish the functions above?) may also be provided: flight log map, flight data, training scenario map, 2d view of area, 3d view of environment, morph parameters and constraints and conditions information (training scenario flight envelope) which may include space (location, altitude, distance min/max and coverage/area), time (start/end of events, time of the day, order of events), environment (weather and fuel), communication (voice (from instructor), recorded audio, text/chat (from instructor —datalink) and recorded text) and alerts specs (triggers and type of alert to instructor).

One embodiment of the CROSSTAFF SAT has the following interaction requirements (i.e., what interactive mechanisms are needed to use the information and data to accomplish the functions?): tool to tag decision points in flight log, tool to select/identify constraints in flight log, mechanism to transfer decision points and constraints from flight log to training scenario, display to visualize flight log, display to visualize training scenario, parameters box to define flight log, parameters box to define training scenario environment, parameters box to define conditions and constraints for training scenario (including initial conditions and post-morph conditions), tool to create and parameterize morphs in training scenario, interactive timeline to describe flight log, interactive timeline to describe training scenario and preview tool to visualize constraints and conditions for key events (provides and ability for scenario author to see/experience the conditions to see if they work.)

Example embodiments of a user interfaces for CROSSTAFF for scenario creation and authoring are shown in FIGS. 14-17.

The SAT may allow flight paths (waypoints) to be created from scratch without the need for a flyable play log of a mishap. This allows CROSSTAFF to be used for scenario development and training by platforms that do not have black box recorders.

The instructor flight monitor tool provides pilot instructors or simulator operators the ability to monitor a training flight to ensure that the pilot is staying within the key event and decision point boundaries of the flyable scenario that will lead to experiencing the mishap conditions. This part of the CROSSTAFF tool integrates the real/time PME and includes developed measures capable of evaluating the CROSSTAFF conditions. The IFM is able to display real time alerts in the IFM as trainees flying Xplane scenarios deviated from the conditions defined in the IFM condition management system.

Figure 18:
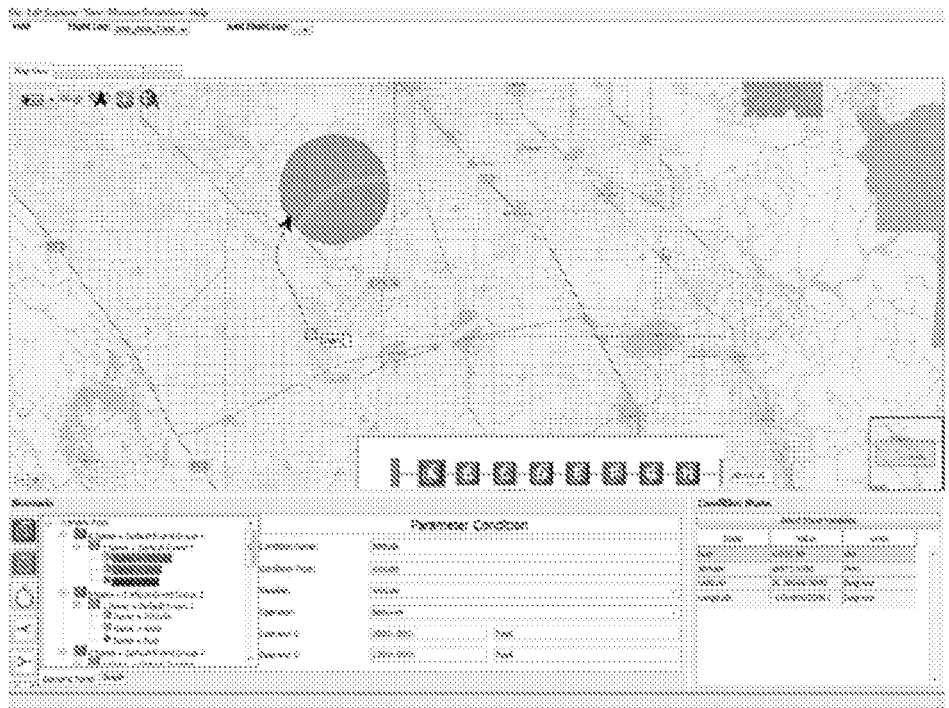
FIG. 18 illustrates an example embodiment of the CROSSTAFF user interface when it is in instructor flight monitoring mode.

FIG. 18 shows the CROSSTAFF user interface when it is in instructor flight monitoring mode. In this mode, CROSSTAFF is connected to a flight simulator (in this case X-Plane) and is collecting real time data from the simulation. In the figure, the first event group has been selected and is actively being monitored. This event group contains three conditions (altitude, area and fuel). The lower left hand panel shows the current status of these three conditions. The conditions which are not currently satisfied (altitude, area) are shown in red, and the condition which is currently satisfied (Fuel) is shown in green. This means that at the current time in the simulation the pilot is not within the range of the altitude condition (the pilot is too high) and not within the range of the area condition (outside of the circle shown on the map). At the current time in the figure, the pilot is within the fuel range (and hence the fuel is shown as green in the lower left hand panel.

Figure 19:
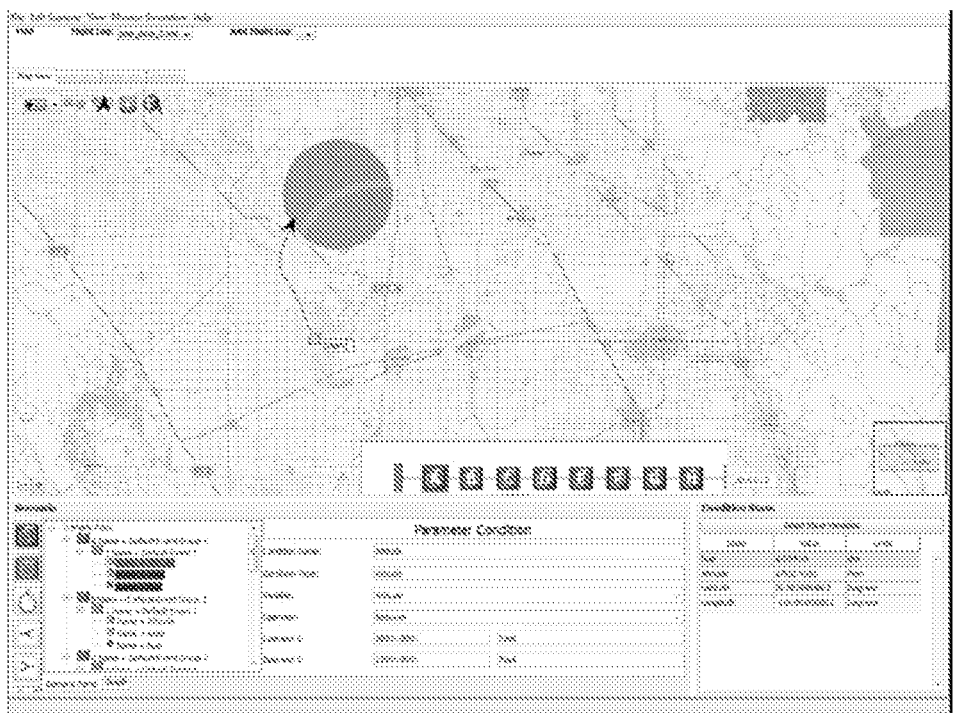
FIG. 19 illustrates an example of the user interface showing a pilot has moved into an area circle shown on the map and the area condition is now satisfied.

A short time later from the state shown in FIG. 18, the pilot has moved into the circle shown on the map and the area condition is now satisfied. This is shown in FIG. 19. At this time the area on the map has turned green to indicate the area condition is satisfied and the area condition in the lower left hand panel for the decision point has also turned green. In this state, the pilot only needs to satisfy the altitude condition to fully meet the conditions for the decision point.

FIGS. 26 and 27 illustrate example user interactions possible with the tools described above.

In addition to the flight safety training embodiment of the invention shown in CROSSTAFF, many other embodiments are possible. Some of these examples include: a system for creating scenarios to train cultural skills from cultural lessons learned by warfighters (using the warfighters' memory as a data source) in the field as they interact with people indigenous to the region; a system for creating scenarios to train collaborative military planning from electronic traces of collaborative activities in planning tactical and strategic operations; a system for creating scenarios to train game-specific skills from logs of expert game players; a system for creating scenarios to train unmanned vehicle operations from electronic traces from the operator control station; a system for creating scenarios to train cyber defense operators in defense against specific attacks from electronic traces of those attacks; and a system to create scenarios for active after action reviews in simulators from logs of trainee behavior in the simulator.

Using the Scenario Generation and Monitoring Systems and Methods

Functionally, the scenario generation and monitoring system generally has tools of two kinds, those for creating/authoring and those for monitoring. For illustration purposes and not for limitation, one embodiment of the present invention is shown in FIG. 3 having tools for authoring and monitoring. The tools for authoring can be further subdivided into tools for identifying key events and decision points and tools for generalizing those decision points. Tools structured this way match the approach outlined and shown in FIG. 1 earlier. In FIG. 3, this is shown graphically with icons adjacent to the tools' functions.

The authoring tools assist instructors in the rapid creation of scenarios that are reasonably faithful to the mishap as described in the flight log. For this kind of scenario, instructors simply choose sensible waypoints (and other event points, if necessary), and the tools supply a little spatial and temporal "room" around them. Instructors can also use the tools to adjust spatial, temporal, and other constraints beyond this point if circumstances warrant. The authoring tools also allow the creation of a flight log based scenario that has the same underlying cause as the real mishap, but that on the surface looks different to the trainee. The tools allow the instructor to create these by visiting each key event and decision point, and by generalizing it as much as possible. From these generalizations, a scenario is constructed by choosing legal values for them, and this normally results is a very different-looking scenario, even though the important aspects of the underlying events and decision points have been preserved: trainees will find themselves in the same safely-related situation. A notional authoring screen, illustrated in FIG. 4A, shows the map with an overlay representing the flight path. The points on the flight path key events and decision points, the details of which are specified in the pane below the map.

FIG. 4B shows a corresponding notional monitoring screen. Here, the gantt-chart-like representation indicates that the key events have a number of components whose timing is interrelated. This kind of event representation for a scenario will be useful, for example, when an instructor or a simulator operator needs to recreate a complicated series of equipment failures with certain constraints on timing. Other monitoring screens could show higher-level progress through the scenario.

An illustration of a suitable computer program product capable of executing the described methods is shown in the functional diagram in FIG. 3.

In one embodiment, the scenario generation and monitoring system is a desktop Java application. The user interface is assembled using the SWING widget toolkit. The system is built out of the following components, seen in FIG. 6.

The performance measurement engine (also referred to as the PME herein) collects flight data from flight simulators and calculates whether conditions defined by the scenario generation and monitoring system are being met. It has a separate connector for each simulator it can collect data from. The PME runs in a separate process space from the scenario generation and monitoring system proper and communicates with it through Web Services using SOAP.

The X-Plane Plug-in uses the X-Plane SDK for the X-Plane simulator. It runs within X-Plane. It samples data at a regular interval from the simulator while it's running. It outputs the data it samples into a socket that the PME connector listens to in an XML format. It also outputs into a file in the same format. Each XML element contains a timestamp, latitude and longitude of the aircraft and optionally any other data that is available from a flight log or a simulator output such as the status and health of the airplane (e.g. altitude, airspeed, fuel level) and environmental data (e.g. wind speed, ceiling).

The simulation manager is responsible for gathering the aircraft data and the status of the condition variables during the simulation from the PME. It does this by communicating with the PME web service. Before the simulation starts, the simulation manager sends a list of the conditions to the PME that it wants the PME to monitor as well as all the aircraft data it needs. Once the simulation starts, the simulation manager polls the PME at a regular interval (once a second by default) for this information.

The flight data controller serves flight log data to the visualization manager and the aircraft state manager. It loads the flight data from a file generated by the X-Plane plug-in. The flight data controller retrieves the log file from the file system, reads the xml content of the file and loads it into memory as a sequential list of flightdata Java objects. The other components query the flight data controller to extract flight data. A component can either request the entire flight data or request the data pertaining to a particular time interval.

The visualization manager is responsible for displaying a geographical map and the flight path. To display the map, it contacts a local or remote OpenStreetView map tile server and retrieves tiles in png format using the latitude and longitude of the first data point in the flight path and a default zoom level. It then displays these tiles in the UI. The flight path is drawn on top of the map using Java's 2D graphics library. In authoring mode the visualization manager draws the flight map from the data it gets from the flight data controller. During the simulation the flight path is updated live on the map from the data that comes from the simulation manager.

The condition manager has a condition library that contains condition definitions stored in an xml file. It is loaded and de-serialized into a Java class using an XML Decoder. In general, each condition type is defined by a Display Name, Unit and a Name. The name is used for mapping the condition to the data type coming from the simulator. For example, the fuel level condition could be represented as follows: display name="fuel", units="lbs." and name="m_fuel_data". The conditions themselves (i.e the instances and not the definitions), with the exception of the geospatial ones, are specified using an expression language that supports the following operators: equal, not equal, less than, greater than and between. For example, the author can specify that the pilot's fuel must "between 5000 and 6000 Lbs.". Geospatial conditions are defined by specifying an area on the map. For example, a circle is defined by a latitude, longitude and a radius in nautical miles. During simulation monitoring, the condition panel uses the data from the simulation manager and updates each condition's status at each time interval.

The aircraft state manager displays the aircraft data. During the simulation, it retrieves the data from the simulation manager at each time interval and updates the GUI. During the authoring phase, it displays aircraft data from the flight log it retrieves from the flight data controller.

The scenario manager stores scenarios in xml files. The files contain the following information: one or more flight log file paths or database identifier; a tree of decision points, event and conditions; the list of aircraft state variable that is visible on the state condition panel; and a list of map annotations such as bookmarks and waypoints.

One Embodiment of the Scenario Generation Methods and Systems in Operation:

The systems and methods for scenario generation and monitoring can be illustrated with a realistic but partially fictional example centered around a pilot's misjudgment of the effects of low fuel on trying to land in worsening weather. In this example, the pilot was returning to Lemoore Naval Air Station from a low altitude training mission in the Panamint Valley. He was somewhat low on fuel, and he had reports that the visibility ceiling at Lemoore was dropping rapidly. Rather than landing safely at China Lake, though, he pressed ahead to Lemoore where he took off from. On reaching Lemoore, he discovered that the cloud ceiling was less than 200 ft., but he did not have enough fuel to land anywhere else. After an attempted approach on runway 32L he switched to an approach on runway 32R. He was unaware that the runway lighting was unusual on runway 32R, and as a result he missed the runway and brought his left wing in contact with the ground and right wheel in the mud. FIG. 2 shows a map of the scenario.

To turn this mishap into a scenario, we start with the FDR log and the identified MFOQA events from the flight. These tell us the exact position, heading, and velocity of the aircraft as well as a number of internal variables such as remaining fuel. The next step is for the instructor to identify the key events and decision points in the flight, which may be seen in the first column of Table 1 at FIG. 21. The generalized conditions for those decision points may be seen in the second column.

The events in the first column of Table 1 at FIG. 21 are then mapped to the flight timeline, and specific ranges of measures are provided whenever possible for the conditions in the second column. For convenience and efficiency, the instructor also may opt to edit out any portion of the timeline that is unnecessary. At this point, the scenario is ready for a new trainee to fly.

FIG. 7 shows a typical scenario creation sequence. The user starts by requesting the creation of a scenario from the scenario manager. In this case the request includes the name of the flight log path. The scenario manager creates the scenario context in memory and requests the flight data controller to load the flight log. The flight data controller retrieves the log file from the file system, reads the xml content of the file and loads it into memory as a sequential list of flightdata java objects. The scenario generation and monitoring system then requests the visualization manager to display the flight path. The visualization manager retrieves the flight path data from the flight data controller. First it determines the latitude and longitude of the first data point and retrieves the corresponding map tiles from the OpenStreetView map server. It then displays the map tiles in the UI and draws the flight path on top. The map is annotated using the visualization manager by adding bookmarks, decision points and event points. The Java 2D graphics library is used to place these icons on the map. The conditions are created using the condition manager. Finally all of the work done is saved into a scenario file using the scenario manager.

FIG. 8 displays the sequence of events during a simulation monitoring. The user requests the scenario generation and monitoring system to start monitoring. This request is passed onto to the simulation manager. The simulation manager retrieves the conditions from the scenario manager and sends them to the PME web service in a format that the PME understands. It then starts a separate execution thread that keeps on polling the PME for simulation flight data and condition variable status. When the PME is polled for data it retrieves the simulator data from its collector. The collector listens for flight simulator data from the simulator plug-in asynchronously through a socket. The simulator plug-in sends the data to the socket as it periodically samples the simulator. Once the data percolates all the way back to the PME, it analyzes the data to check whether any of the conditions have been violated and send all this information back to the simulation manager through the web service. The simulator manager updates the visualization manager with the flight data and the condition status. The visualization manager then updates the map and the flight path on the UI.

During the execution of the scenario, the instructor will ensure that the pilot stays within the scenario envelope either by alerting the trainee or by creating invisible barriers that the simulator cannot fly through. In this manner, the trainee is guaranteed to encounter all the key events, and is guaranteed to be in a position to make the key decision, in this case to land at China Lake or to continue on to Lemoore.

There are several unique and valuable benefits to the approach to creating scenarios from flight logs that we have described here. It is both easier and more precise to develop scenarios with MFOQA data as a starting place than starting from scratch. The instructor has something to work from to identify decision points rather than generating them from scratch. Instructors directly identify the important factors for the incident. Recreation of scenarios closely resembling the mishap is fast and easy. Such scenarios extend the "reach" of instructors—tools to manage the process allow instructors to focus on instruction, and not on scenario conditions. This is especially true of scenarios that require a complex schedule of in-flight failures and other events. Likewise, when experienced instructors are scarce, scenarios as described here can help less experienced instructors create meaningful training experiences for the pilot. This is especially true of the scenarios that are a result of heavy generalization of causative events and that therefore (on the surface) do not resemble the original mishap. The generalization of events leads to substantial experiential variation, giving a high "replay value": to the scenarios constructed this way. No two generalized flights will be exactly the same. It is harder for trainees to "game the system," and knowledge and skill transfer should be high.

Another Example Embodiment of the Scenario Generation Methods and Systems in Operation:

One specific example embodiment of a scenario generation system in operation is the CROSSTAFF (Creating Requirements for Operational Safety Support through Assessment of Flight simulation Fidelity) system. CROSSTAFF is a tool suite and methodology to help make a pilot's active participation in learning to make the training more relevant, memorable, and effective. This embodiment is consistent with the methods and systems described above.

Given the conceptual steps shown in FIG. 1A, the actual flight path as recorded (FIG. 1A(a)), instructors identify key events and decision points in the flight that led to the safety incident, (FIG. 1A(b)). Instructors then refine the definitions of those events and decision points by specifying more general boundaries that would lead to the same flight outcome (FIG. 1A(c)). Finally, CROSSTAFF creates an invisible envelope around those expanded points (FIG. 1A(d)). The result is a scenario definition that allows pilots to actually re-fly the incident and encounter the fundamental conditions that were causal in the mishap.

This embodiment of CROSSTAFF also incorporates the two modes of scenario authoring and scenario monitoring. Scenario authoring uses the approach described above and creates a training scenario from flight data (it can also be used without flight data). The other mode, scenario monitoring, is used during training to monitor that the pilot is staying within the envelope boundaries.

This embodiment of the CROSSTAFF methods and systems are illustrated with a realistic but fictional example centered around a pilot's misjudgment of the effects of low fuel on trying to land in worsening weather. In this example, the pilot was returning to Lemoore Naval Air Station from a low altitude training mission in the Panamint Valley. The pilot was somewhat low on fuel, and had reports that the visibility ceiling at Lemoore was dropping rapidly. Rather than landing safely at China Lake, the pilot pressed ahead to Lemoore where they had taken off from. On reaching Lemoore, the pilot discovered that the cloud ceiling was less than 200 ft., but they did not have enough fuel to land anywhere else. After an attempted approach on 32L the pilot switches to an approach on 32R, the pilot is unaware that the runway lighting is different on the two runways. As a result, the pilot misses the runway and the left wing contacts with the ground and right wheel in the mud. FIG. 2 shows a map of the scenario.

To turn this mishap into a scenario, CROSSTAFF may start with the flight data log of the flight. This records the exact position, heading, and velocity of the aircraft as well as a number of internal variables such as remaining fuel. The next step is for the scenario author to identify the key events and decision points, which may be seen in the first column of Table 1 in FIG. 21. The generalized conditions for those decision points may be seen in the second column. The events in the first column of Table 1 FIG. 21 are then mapped to the flight timeline, and specific measures are provided whenever possible for the conditions in the second column. The scenario author also has the option at this point of editing out any portion of the timeline that is unnecessary.

At this point, the scenario is ready for a new trainee to fly. During the execution of the scenario, CROSSTAFF will unobtrusively ensure that the pilot stays within the scenario envelope either by alerting the instructor or by creating invisible barriers that the simulator cannot fly through. In this manner, the trainee is guaranteed to encounter all the key events, and is guaranteed to be in a position to make the key decision, in this case to land at China Lake or to continue on to Lemoore.

Figure 22:
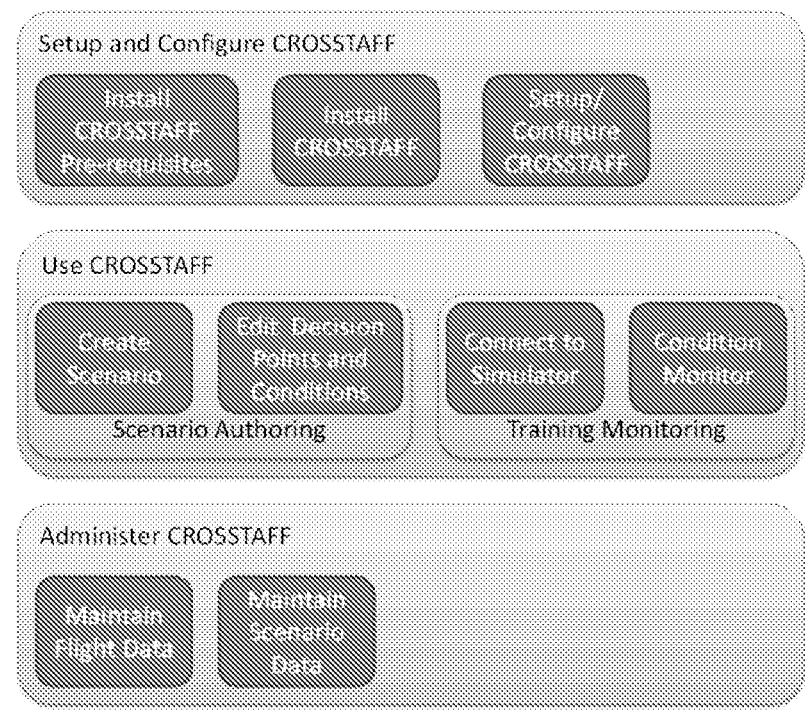
FIG. 22 illustrates an overview of one embodiment of the CROSSTAFF operational workflow.

The overall operation of this embodiment of CROSSTAFF can be partitioned into three major areas. These are setup and configure, use, and administration as shown in FIG. 22. These major areas can be further subdivided as follows: Setup and Configure, Use and Administer.

Setup and Configure. This set of tasks brings CROSSTAFF to the point where it can be used. This includes: Providing the system pre-requisites—this task is to provide the required pre-requisites software for CROSSTAFF to function; Install CROSSTAFF—CROSSTAFF is installed as an executable program on a PC; and Setup and configure CROSSTAFF—CROSSTAFF requires some setup and configuration to operate in the user's environment.

Use. Once CROSSTAFF is setup and configured, the system can be used. CROSSTAFF is used in two major ways: scenario authoring and training monitoring. Scenario authoring tasks are used to create the training scenario from either flight data or from scratch. These tasks include analyzing the fight data, defining decision points and specifying conditions. Training monitoring tasks are used during training. They include tasks such as setting up the simulator connection and monitoring the conditions for different decisions points to see if the pilot in training is meeting the necessary characteristics of the scenario.

Administer. Some administration is required to maintain CROSSTAFF in a working environment. This includes, for example, maintaining flight data to manage the flight data sources that are used with CROSSTAFF. There are also scenario files which need to be managed.

CROSSTAFF may be used to two major ways. First, CROSSTAFF may be used to analyze flight data and create training scenarios and second CROSSTAFF is used to monitor training conditions. The operation of the CROSSTAFF tools used in these two areas is described in the following sections.

Figure 23:
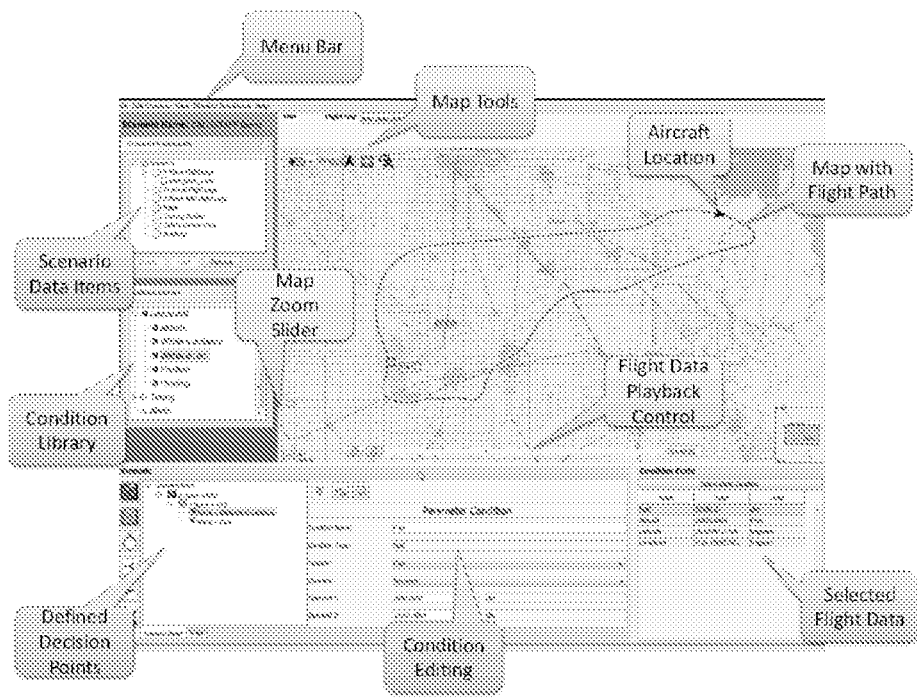
FIG. 23 illustrates one embodiment of a CROSSTAFF user interface for authoring

Before a training exercise is conducted, CROSSTAFF may be used to analyze flight data and author the training scenario. To accomplish this, CROSSTAFF provides a set of capabilities. An overview of the elements of the CROSSTAFF user interface is shown in FIG. 23.

The first step in CROSSTAFF is to create a new scenario. If a scenario already exists that the author wants to edit, it can be loaded and the same editing functions can be used. To create a scenario, the author selects file>create scenario. A create scenario pop-up window will appear. The author fills in the scenario name and the location where to save the scenario. After the author specifies this information, the screen will look like FIG. 14. The author clicks create and the scenario is created.

At this point in the process the author can either load existing flight data or define a set of waypoints. The flight data can be obtained from aircraft flight recorders, or from a simulation run and data collection. This walkthrough will show both options to add flight data to the scenario.

If flight data is available, then it can be added to the scenario for analysis and to help the author create an effective training experience. To add flight data to an existing scenario (such as the one created above), click on "X-Plane Flight Logs" in the scenario documents panel (the upper left panel). Then click the load button. Navigate to the flight data and click open. The CROSSTAFF CD contains several example flight data files. After the flight data is loaded, the CROSSTAFF screen should look like a map.

The CROSSTAFF map contains several control features including (1) the map may be re-positioned or panned by left clicking on the map and dragging it and (2) the map may be zoomed in and out using the scroll wheel on the mouse or by using the slider bar on the lower left corner of the map Another method for loading flight data into CROSSTAFF is to define a flight path manually on the map. This method does not provide actual flight data, but does provide a basis to create a scenario.

Figure 24:
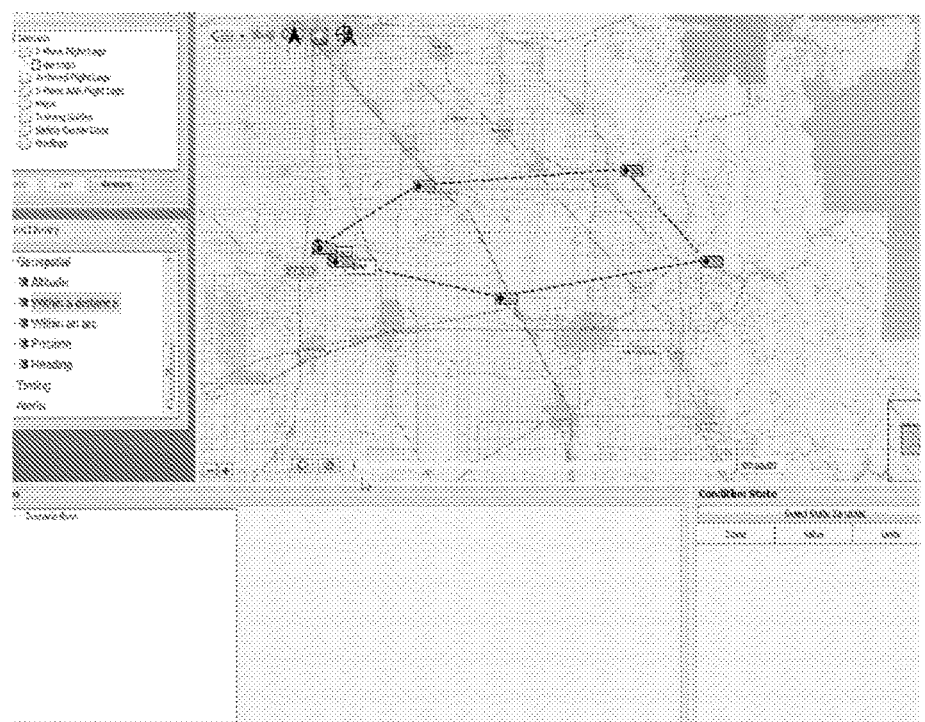
FIG. 24 illustrates one embodiment of the completion of generating a path with CROSSTAFF.

To create a set of waypoints, click on a map tool interface and select Waypoint as the point type. You can also mark the map with bookmarks, decision points and event points in a similar way. Now, click the map to place the waypoint at the desired location on the map. Repeat these operations until you have places all of the waypoints needed. Then click another map tool interface, generate path. The generate path pop-up window will be displayed. In this window, the scenario author can set data values for each of the waypoints such as fuel, altitude and air speed. CROSSTAFF will link the waypoints into a flight path. The CROSSTAFF screen should look similar to FIG. 24 after the path has been generated.

The scenario author can view the flight data by selecting the data of interest and then moving the timeline scroll bar to see the data over a time range. Flight data values can be selected by clicking on the select state variables button in the user interface. Clicking this button will bring up the select visible states window where the author can select the data of interest. After the data is selected click OK and the selected variables will be shown. The data values are shown for the location of the aircraft on the flight path. The author can move the timeline slider bar on the bottom of the map to change the location of the aircraft and hence the location for which the flight data is shown.

At this point in the process the scenario author will analyze the flight data and determine where the key decision points are during the flight. The decision points can be marked on the map with the marker tool (similar to how waypoints are defined). Decision points are added to the scenario using a drag and drop operation with the buttons on the lower left side of the user interface. The author clicks on the event group button and drags it on top of the scenario root line in the scenario panel and drops it. A text box pops up and you specify a name for the event group. Next, the same operation is done with the Key Event button and a key event is dropped on the event group just created. In this example the decision point is the point in the flight where the pilot needs to make a return to base decision. Additional event groups and key events can be added to the scenario creating a hierarchy of groups and events. The conditions (shown in the next section) are added to the key event items.

Conditions define the characteristics of the key events in the scenario. CROSSTAFF supports a library of condition types which includes aircraft status conditions, environment conditions and geospatial conditions. Conditions are created by navigating to a condition type in the condition library panel and dragging it onto the event in the scenario panel in the lower left panel of the CROSSTAFF interface.

CROSSTAFF contains a number of status conditions that can be added to the scenario. In this example we will create a status condition that bounds the amount of fuel the aircraft should have at a particular point in the flight. To create this condition in the scenario, navigate in the condition library to health and status>fuel and drag that condition onto the RTB event (created above) in the scenario panel. When you drop the condition on the event, a condition name input window will pop up for you to specify a name. Click on the condition in the lower left panel and the condition details will be displayed in the lower center panel. Click on the edit record button in the center panel and the condition properties can be changed. For the fuel condition, the condition parameters can be: name and type, variable, operator and operand 1 and operand 2. Name and Type is the name and type of the condition. Variable is the flight data variable that this condition is connected to. This is the data value from the simulator that will be evaluated against this condition during training time. Operator is the logical operator that is used to compare the variable data to the parameters given in the condition. The options are: equal, not equal, between, less than, greater than. Operand 1, operand 2 are the values used with the operator. For example, if the fuel condition is that the fuel should be between 9,900 and 10,100, then the operator (from above) would be set to between and operand 1 should be set to 9,900 and operand 2 should be set to 10,100.

When a health and status condition is selected in the scenario panel, that condition is applied to the flight data and the results are shown on the map. Using the fuel example above, CROSSTAFF will color the flight path blue at all points where the fuel is within the range 9,900 to 10,100 and red for all points outside of that range. This is a preview of where the condition would be satisfied and where it would be unsatisfied given the flight data.

CROSSTAFF can also represent geometric condition. Often the conditions are defined in combination such that one condition defines an area of interest and another condition defines what has to be true in that area. For example, the combination of a within an arc condition and a fuel condition where both of the conditions must be true (in other words, the fuel level should be in the range at the same time the aircraft in within a certain area).

To create a geometric condition drag the condition from the condition library to the scenario panel and drop it on the event it should be associated with. Then click on the condition edit button. Some of the condition parameters for geometric conditions can be specified using the map. In the case of the within an arc condition, click the define points button and follow the prompts at the lower left of the main window. Click the map to specify the center of the arc, the inner and outer radii and the start and stop of the arc. Then click on the save condition button and the area will be displayed on the map.

If there is flight data in the scenario, CROSSTAFF can automatically generate a set of conditions based on the flight data. To automatically generate events click the generate events map button in the upper left corner of the map panel. When you click this button a generate events window appears and the author can specify how many events should be created and what variance should be used. For example, if 8 is used for the points parameter, then CROSSTAFF will partition the flight data timeline up into 8 equal parts and create an event for each of these partitions. Then if 5 is used as the variance %, then at each event point, conditions will be created for fuel, altitude and within a distance which are plus and minus 5 percent from the value of the flight data at that point. For example, if at the event point, the fuel was 10,000 in the flight data, then the fuel condition for that point would be set to between 10,000–5% and 10,000+5%. This would be done for each of the 8 event points created.

After the events and conditions are automatically created, if you click on a condition in the scenario panel, such as an area condition, the area for the condition will be displayed on the map.

When all of the event groups, events and conditions have been defined, the scenario can be saved. To save the scenario click file in the menu bar and select save as. Specify the file name and location and the scenario will be saved.

During training, CROSSTAFF provides several capabilities to support the instructor pilot, or simulator operator by monitoring and displaying the decision point conditions that must be met for the pilot to experience the scenario.

The capabilities that CROSSTAFF provides which can be used during training are described below.

At training time, a scenario is loaded that was created by a scenario author. Scenarios are created once and re-used many times. Scenarios can also be quickly edited to meet the specific training needs of the pilot in training. To load a saved scenario, start up CROSSTAFF and click on file in the menu bar and select load. CROSSTAFF will ask for the file name and location and then load the scenario into CROSSTAFF.

Just before the training activity is to begin, CROSSTAFF should be connected to the simulator. Connecting to the simulator gives CROSSTAFF access to real-time simulator data which CROSSTAFF uses for monitoring. The instructor pilot or simulation operator connects CROSSTAFF to the simulator by clicking on monitor simulation in the menu bar and selecting connect to simulator. An option window is displayed and the user selects X-plane.

Figure 25:
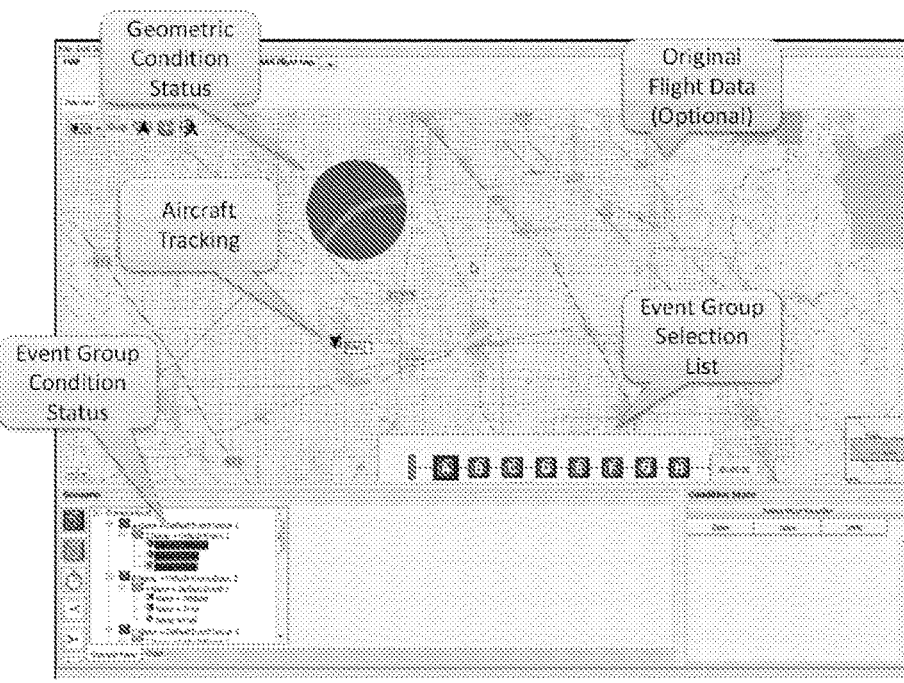
FIG. 25 illustrates one embodiment of .CROSSTAFF in monitoring Mode.

When CROSSTAFF connects to the simulator, it switches into monitoring mode. Monitoring mode is shown in FIG. 25.

As the pilot in training flies the aircraft in the simulator, the location of the aircraft is transferred to CROSSTAFF and tracked on the map. The data values shown in the condition state panel are continually updated based on the information received from the simulation environment.

When an event is selected, all of the conditions within that group are monitored. This means that the condition value is calculated and CROSSTAFF determines if the condition is satisfied given the current data from the simulation environment. The evaluation of the condition is indicated in the scenario panel by coloring the condition green if the condition is satisfied, and red if it is not.

Area conditions are monitored in the same way as value conditions. The only difference is that the area conditions are also shown on the map.

A short time later in the training, the pilot has traveled into the area and changed their altitude such that the three conditions for event group A are now satisfied.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

We claim:

1. A processor based method of defining at least one scenario event for a simulation executed by a computer based flight simulator, said method comprising:
   identifying at least one event from a plurality of events from a real-world historical event;
   the at least one event having at least one event attribute;
   the at least one event attribute is a non-spatiotemporal event attribute defined by a single value at an event time taken from an aircraft Flight Data Recorder after the real-world historical event;
   generalizing the non-spatiotemporal event attribute as a range of values of the non-spatiotemporal event attribute for the event time;
   defining a generalized event comprising the range of values of the non-spatiotemporal event attribute for the event time whereby the generalized event is an at least one scenario event for a simulation executed by a computer based flight simulator;
   the step of identifying at least one event having at least one event attribute comprises identifying a first event associated with at least one first non-spatiotemporal event attribute at a first event time and a second event associated with at least one second non-spatiotemporal event attribute at a second event time;
   the step of generalizing the non-spatiotemporal event attribute as a range of values of the non-spatiotemporal event attribute further comprises generalizing the at least one first non-spatiotemporal event attribute to define a first generalized event and generalizing the at least one second non-spatiotemporal event attribute to define a second generalized event;
   connecting the first generalized event and the second generalized event in at least one continuous envelope to create at least one scenario envelope whereby the at least one scenario envelope defines the range of values of the non-spatiotemporal event attribute that will ensure a user of the simulation will encounter the first generalized event and the second generalized event; and communicating at least one value of the range of values of the first non-spatiotemporal event attribute of the first generalized event and communicating at least one value of the range of values of the second non-spatiotemporal event attribute of the second generalized event, both values within the at least one scenario envelope, to the user of the simulation executed by the computer based flight simulator.

2. The method of claim 1 wherein:
   the at least one first non-spatiotemporal event attribute comprises a first decision to be made by the user in a training simulator; and
   the at least one second non-spatiotemporal event attribute comprises a second decision to be made by the user in the training simulator.

3. The method of claim 1 wherein:
   the at least one first event and the at least one second event represents the real-world historical event involving a real entity in a real mishap;
   the real-world event having a first and a second actual event attribute value taken from the aircraft Flight Data Recorder after the real-world historical event;
   the first actual event attribute value defines the value of the at least one first non-spatiotemporal event attribute at the event time;
   the second actual event attribute value defines the value of the at least one second non-spatiotemporal event attribute at a second event time;
   the simulation comprises a training simulation representing the real mishap in a training simulator representing the real entity; and
   the at least one scenario envelope defines a range of values of the first non-spatiotemporal event attribute and a range of values of the second non-spatiotemporal event attribute capable of being experienced by a user during the training simulation.

4. The method of claim 1 wherein the step of identifying a first event associated with at least one first non-spatiotemporal event attribute and a second event associated with at least one second non-spatiotemporal event attribute comprises manually selecting the first event and the second event from a partially ordered sequence of events.

5. The method of claim 1 wherein the step of identifying a first event associated with at least one first non-spatiotemporal event attribute and a second event associated with at least one second non-spatiotemporal event attribute comprises automatically selecting the first event and the second event from a partially ordered sequence of events.

6. The method of claim 1 wherein:
   the step of generalizing the at least one first non-spatiotemporal event attribute to define a first generalized event comprises defining the at least one first non-spatiotemporal event attribute as a plurality of numerical constraints; and the step of generalizing the at least one first non-spatiotemporal event attribute to define a first generalized event comprises defining the at least one first non-spatiotemporal event attribute as a plurality of numerical constraints.

7. The method of claim 1 wherein the step of connecting the first generalized event and the second generalized event in a continuous envelope to create a scenario envelope comprises defining a set of possible scenario event attributes between and including the first generalized event and the second generalized event.

8. The method of claim 1 wherein the step of connecting the first generalized event and the second generalized event in a continuous envelope to create a scenario envelope comprises:
defining a first three-dimensional shape of the first generalized event in an attribute space;
defining a second three-dimensional shape of the second generalized event in the attribute space; and
connecting the first three-dimensional shape and the second three-dimensional shape linearly in the attribute space.

9. The method of claim 1 wherein the simulation comprises a non-flight simulation.

10. The method of claim 1 further comprising:
monitoring an activity of a user during the simulation;
the activity having an activity attribute;
comparing the activity attribute to the generalized event; and
determining whether to allow a next activity.

11. The method of claim 1 further comprising:
receiving a first activity attribute of the user in reaction to the first generalized event; and
the first activity attribute of the user influencing the second generalized event.

12. The method of claim 1 wherein:
the non-spatiotemporal event attribute comprises a plurality of event attributes; and
the at least one scenario envelope comprises a plurality of scenario envelopes.

13. A processor based system comprising:
a memory;
a processor;
a communications interface;
an system bus coupling the memory, the processor and the communications interface; and
the memory encoded with a scenario generation process that when executed on the processor is capable of defining at least one scenario event for a simulation on a processor based system by performing the method of:
identifying at least one event from a plurality of events from a real-world historical event;
the at least one event having at least one event attribute;
the at least one event attribute is a non-spatiotemporal event attribute defined by a single value at an event time taken from an aircraft Flight Data Recorder after the real-world historical event;
generalizing the non-spatiotemporal event attribute as a range of values of the non-spatiotemporal event attribute for the event time;
defining a generalized event comprising the range of values of the non-spatiotemporal event attribute for the event time whereby the generalized event is an at least one scenario event for a simulation executed by a computer based flight simulator;
the step of identifying at least one event having at least one event attribute comprises identifying a first event associated with at least one first non-spatiotemporal event attribute at a first event time and a second event associated with at least one second non-spatiotemporal event attribute at a second event time;
the step of generalizing the non-spatiotemporal event attribute as a range of values of the non-spatiotemporal event attribute further comprises generalizing the at least one first non-spatiotemporal event attribute to define a first generalized event and generalizing the at least one second non-spatiotemporal event attribute to define a second generalized event;
connecting the first generalized event and the second generalized event in at least one continuous envelope to create at least one scenario envelope whereby the at least one scenario envelope defines the range of values of the non-spatiotemporal event attribute that will ensure a user of the simulation will encounter the first generalized event and the second generalized event; and
communicating at least one value of the range of values of the first non-spatiotemporal event attribute of the first generalized event and communicating at least one value of the range of values of the second non-spatiotemporal event attribute of the second generalized event, both values within the at least one scenario envelope, to the user of the simulation executed by the computer based flight simulator.

14. The processor based system of claim 13 wherein:
the non-spatiotemporal event attribute comprises a plurality of event attributes; and
the at least one scenario envelope comprises a plurality of scenario envelopes.

* * * * *